US008933909B2

(12) United States Patent
Giddings et al.

(10) Patent No.: US 8,933,909 B2
(45) Date of Patent: Jan. 13, 2015

(54) TOUCH PANEL AND DISPLAY DEVICE

(75) Inventors: Devin Giddings, Eindhoven (NL); Nobuyoshi Saito, Kanagawa-ken (JP); Hideaki Fukuzawa, Kanagawa-ken (JP); Yoshihiko Fuji, Kanagawa-ken (JP); Michiko Hara, Kanagawa-ken (JP); Hajime Yamaguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 13/479,861

(22) Filed: May 24, 2012

(65) Prior Publication Data

US 2013/0076687 A1 Mar. 28, 2013

(30) Foreign Application Priority Data

Sep. 27, 2011 (JP) ................................. 2011-211211

(51) Int. Cl.
*B82Y 25/00* (2011.01)
*G01N 17/00* (2006.01)
*G06F 3/041* (2006.01)

(52) U.S. Cl.
CPC ............ *G06F 3/0412* (2013.01); *G06F 3/0414* (2013.01)
USPC .............................. 345/174; 324/252; 338/13

(58) Field of Classification Search
None
See application file for complete search history.

(56) References Cited

U.S. PATENT DOCUMENTS

| 2006/0091991 | A1* | 5/2006 | Wohlgenannt et al. | ......... 338/13 |
| 2008/0238871 | A1* | 10/2008 | Tam | ............... 345/158 |
| 2010/0194708 | A1* | 8/2010 | Popovich | ....................... 345/173 |
| 2010/0302199 | A1* | 12/2010 | Taylor et al. | ................... 345/174 |
| 2011/0068786 | A1* | 3/2011 | Ohta et al. | ..................... 324/252 |
| 2011/0295128 | A1 | 12/2011 | Yuasa et al. | |
| 2012/0079887 | A1 | 4/2012 | Giddings et al. | |

FOREIGN PATENT DOCUMENTS

| JP | 2002-148132 | 5/2002 |
| JP | 2010-15505 | 1/2010 |
| WO | WO 2011/024349 A1 | 3/2011 |

OTHER PUBLICATIONS

U.S. Appl. No. 13/927,886, filed Jun. 26, 2013, Fuji, et al.
U.S. Appl. No. 13/246,069, filed Sep. 27, 2011, Devin Giddings, et al.
Office Action mailed Nov. 13, 2014 in Japanese Application No. 2011-211211 filed Sep. 27, 2011 (w/English translation).

* cited by examiner

*Primary Examiner* — Joe H Cheng
*Assistant Examiner* — Kwin Xie
(74) *Attorney, Agent, or Firm* — Oblon, Spivak, McClelland, Maier & Neustadt, L.L.P.

(57) ABSTRACT

According to one embodiment, a touch panel includes first interconnections, second interconnections, sensor units and a control unit. The first interconnections are arranged along a first direction, and extend along a second direction intersecting with the first direction. The second interconnections are arranged along a third direction intersecting with the first direction, and extend along a fourth direction intersecting with the third direction. The sensor units are provided in intersection portions of the first and second interconnections, include first and second ferromagnetic layers, and an intermediate layer, allow a current to be passed, and have one end connected to the first interconnections and another end connected to the second interconnections. The control unit is connected to the first and second interconnections. An electric resistance of the sensor units changes in accordance with a stress applied. The control unit senses a change in the electric resistance.

14 Claims, 14 Drawing Sheets

TOUCH PANEL AND DISPLAY DEVICE

CROSS-REFERENCE TO RELATED APPLICATIONS

This application is based upon and claims the benefit of priority from the prior Japanese Patent Application No. 2011-211211, filed on Sep. 27, 2011; the entire contents of which are incorporated herein by reference.

FIELD

Embodiments described herein relate generally to a touch panel and a display device.

BACKGROUND

Touch panels for receiving inputs, for example, from a person's touch, are in widespread use. A convenient input/display device can be obtained by, for example, providing a liquid crystal display device etc. with a touch input function.

For example, there is a type of touch panel system in which a change in electric capacitance when the input surface is touched is sensed. In the system, the response speed is slow due to the problem of the time constant. Therefore, if sensing within a prescribed time is necessary, the arranged density of sensors can be reduced, and consequently the resolution cannot be sufficiently improved.

DETAILED DESCRIPTION

Figure 1:
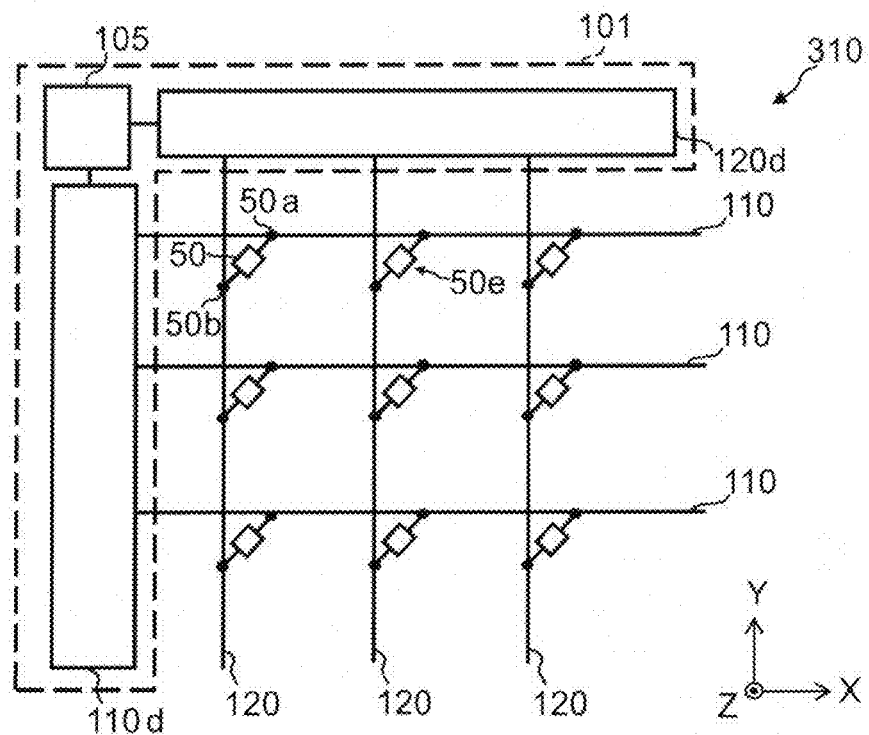
FIG. 1 is a schematic diagram showing the configuration of a touch panel according to a first embodiment.

According to one embodiment, a touch panel includes a plurality of first interconnections, a plurality of second interconnections, a plurality of sensor units and a control unit. The plurality of first interconnections is arranged along a first direction, and each of the first interconnections extends along a second direction intersecting with the first direction. The plurality of second interconnections is arranged along a third direction intersecting with the first direction, and each of the second interconnections extends along a fourth direction intersecting with the third direction. Each of the plurality of sensor units is provided in an intersection portion between each of the first interconnections and each of the second interconnections. Each of the sensor units includes a first ferromagnetic layer, a second ferromagnetic layer, and an intermediate layer containing a nonmagnetic material which allows a current to be passed between the first ferromagnetic layer and the second ferromagnetic layer via the intermediate layer, and has one end connected to each of the first interconnections and another end connected to each of the second interconnections. The control unit is connected to the first interconnections and the second interconnections. An electric resistance between the first ferromagnetic layer of each of the sensor units and the second ferromagnetic layer of the each of the sensor units is configured to change between a high resistance value and a low resistance value which is lower than the high resistance value, in accordance with a stress applied to the sensor units. The control unit is configured to sense a change in the electric resistance of the sensor units.

According to another embodiment, a display device includes a touch panel, a plurality of first transistors, a plurality of pixel electrodes, and an optical layer. The touch panel includes a plurality of first interconnections arranged along a first direction, each of the first interconnections extending along a second direction intersecting with the first direction, a plurality of second interconnections arranged along a third direction, intersecting with the first direction, with each of the second interconnections extending along a fourth direction intersecting with the third direction, a plurality of sensor units each provided in an intersection portion between each of the first interconnections and each of the second interconnections, each of the sensor units including a first ferromagnetic layer, a second ferromagnetic layer, and an intermediate layer containing a nonmagnetic material which allows a current to be passed between the first ferromagnetic layer and the second ferromagnetic layer via the intermediate layer, having one end connected to each of the first interconnections, and having another end connected to each of the second interconnections, and a control unit connected to the first interconnections and the second interconnections. An electric resistance between the first ferromagnetic layer of each the sensor units and the second ferromagnetic layer of the each of the sensor units is configured to change between a high resistance value and a low resistance value, which is lower than the high resistance value in accordance with a stress applied to the sensor units. The control unit is configured to sense a change in the electric resistance of the sensor units. The first transistor is provided in each of the intersection portions. The pixel electrode is provided in each of the intersection portions and directly or indirectly connected to one end of each of the first transistors. The optical layer is configured to emit light or change an optical property of the optical layer including at least one of birefringence, optical rotation, scattering, diffraction, and absorption based on a charge supplied to the pixel electrode via the first transistor.

Various embodiments will be described hereinafter with reference to the accompanying drawings.

The drawings are schematic or conceptual; and the proportions of sizes among portions, etc. are not necessarily the same as the actual values thereof. Further, the dimensions and proportions may be illustrated differently among drawings, even for identical portions.

In the specification of this application and the drawings, components similar to those described in regard to a drawing thereinabove are marked with the same reference numerals, and a detailed description is omitted as appropriate.

First Embodiment

FIG. 1 is a schematic diagram illustrating the configuration of a touch panel according to a first embodiment.

As shown in FIG. 1, a touch panel 310 according to the embodiment includes a plurality of first interconnections 110, a plurality of second interconnections 120, a plurality of sensor units 50, and a control unit 101.

The plurality of first interconnections 110 is arranged along a first direction. Each of the plurality of first interconnections 110 extends along a second direction intersecting with the first direction.

The plurality of second interconnections 120 is arranged along a third direction intersecting with the first direction. Each of the plurality of second interconnections 120 extends along a fourth direction intersecting with the third direction.

Here, for convenience of description, a plane including the first direction and the second direction is defined as the X-Y plane. The direction perpendicular to the X-Y plane is defined as the Z-axis direction.

For example, the first direction is the Y-axis direction. The second direction is the X-axis direction. The third direction is the X-axis direction. The fourth direction is the Y-axis direction.

In the example shown in FIG. 1, the plurality of first interconnections 110 is arranged along the Y-axis direction. Each of the plurality of first interconnections 110 extends along the X-axis direction. The plurality of second interconnections 120 is arranged along the X-axis direction. Each of the plurality of second interconnections 120 extends along the Y-axis direction.

Each of the plurality of sensor units 50 is provided at an intersection portion between each of the plurality of first interconnections 110 and each of the plurality of second interconnections 120. The each of the plurality of first interconnections 110 and the each of the plurality of second interconnections 120 are opposed to each other at the intersection portion. One sensor unit 50 forms one sensing element 50e for sensing. Here, the intersection portion includes a region around the position where the first interconnection 110 and the second interconnection 120 intersect.

One end 50a of each of the plurality of sensor units 50 is connected to each of the plurality of first interconnections 110. The other end 50b of each of the plurality of sensor units 50 is connected to each of the plurality of second interconnections 120.

The control unit 101 is connected to the plurality of first interconnections 110 and the plurality of second interconnections 120.

For example, the control unit 101 includes a circuit for the first interconnection 110d connected to the plurality of first interconnections 110, a circuit for the second interconnection 120d connected to the plurality of second interconnections 120, and a control circuit 105 connected to the circuit for the first interconnection 110d and the circuit for the second interconnection 120d.

Figures 2A, 2B:
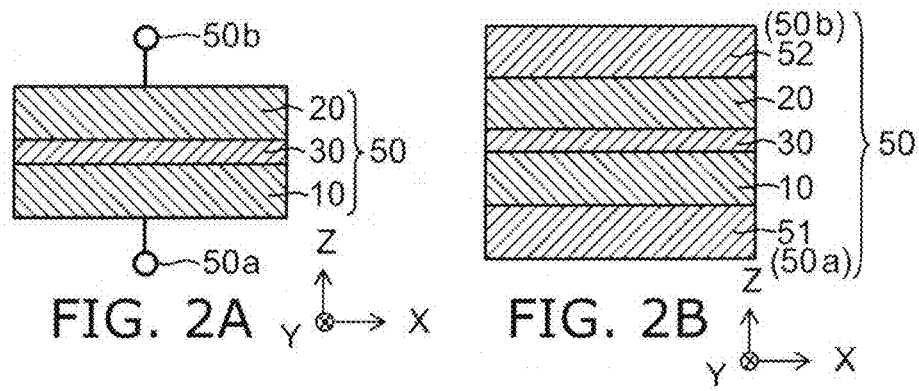
FIG. 2A to FIG. 2C are schematic cross-sectional views showing the configuration of a part of the touch panel according to the first embodiment.
Figure 2C:
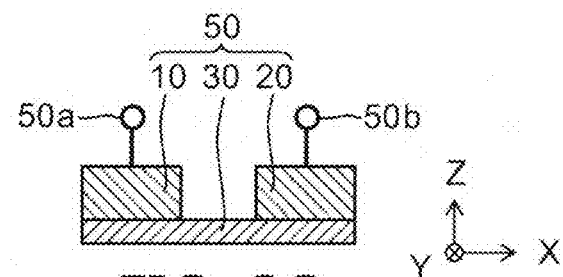

FIG. 2A to FIG. 2C are schematic cross-sectional views illustrating the configuration of a part of the touch panel according to the first embodiment.

As shown in FIG. 2A, each of the plurality of sensor units 50 includes a first ferromagnetic layer 10, a second ferromagnetic layer 20, and an intermediate layer 30. The intermediate layer 30 contains a nonmagnetic material. A current can be passed between the first ferromagnetic layer 10 and the second ferromagnetic layer 20 via the intermediate layer 30.

In the example, the intermediate layer 30 is provided between the first ferromagnetic layer 10 and the second ferromagnetic layer 20. The one end 50a of the sensor unit 50 is, for example, the end on the first ferromagnetic layer 10 side of the sensor unit 50. The other end 50b of the sensor unit 50 is, for example, the end on the second ferromagnetic layer 20 side of the sensor unit 50.

A current can be passed between the first ferromagnetic layer 10 and the second ferromagnetic layer 20 of the sensor unit 50.

For example, as shown in FIG. 2B, the sensor unit 50 may further include a first electrode 51 and a second electrode 52. The first ferromagnetic layer 10 is positioned between the first electrode 51 and the intermediate layer 30. The intermediate layer 30 is positioned between the first ferromagnetic layer 10 and the second ferromagnetic layer 20. The second ferromagnetic layer 20 is positioned between the intermediate layer 30 and the second electrode 52.

In the examples shown in FIG. 2A and FIG. 2B, the first ferromagnetic layer 10 and the second ferromagnetic layer 20 are stacked along the Z-axis direction. However, the embodiment is not limited thereto.

For example, as shown in FIG. 2C, a configuration is possible in which the first ferromagnetic layer 10 is stacked with the intermediate layer 30, the second ferromagnetic layer 20 is stacked with the intermediate layer 30, and the second ferromagnetic layer 20 is juxtaposed to the first ferromagnetic layer 10. Also in this case, a current can be passed between the first ferromagnetic layer 10 and the second ferromagnetic layer 20 via the intermediate layer 30. Thus, the configuration of the sensor unit 50 may be variously modified. In the following, the case is described where the first ferromagnetic layer 10, the intermediate layer 30, and the second ferromagnetic layer 20 are stacked.

In the specification of this application, the state of being stacked includes the state of being directly stacked and also the state of being stacked via another component. Furthermore, the state of being "provided on" includes the state of being disposed in a contact manner and also the state of being disposed via another component.

The electric resistance Rs between the first ferromagnetic layer 10 and the second ferromagnetic layer 20 of the sensor unit 50 changes between a high resistance value Rh and a low resistance value Rl in accordance with the stress applied to the sensor unit 50. The low resistance value Rl is lower than the high resistance value Rh.

The control unit 101 senses a change in the electric resistance Rs in the sensor unit 50. Thereby, the control unit 101 senses the stress applied to the sensor unit 50. Thereby, the pressure from contact to the touch panel 310 is sensed. Since the plurality of sensor units 50 are arranged in the X-Y plane, the position of the contact in the X-Y plane and the change over time of the position of the contact are sensed. In this case, in each sensor element, there is a case where the digital determination of 0 or 1 of whether stress is applied or not is made, and there is also a case where analog value determination is made with the inclusion of the magnitude of the stress value because the value of the stress can be found in accordance with the resistance.

In the touch panel 310, the change in the electric resistance Rs based on, for example, the magnetoresistive (MR) effect, which is utilized in the sensor unit 50. The size of the sensor unit 50 can be made small, and also the response time is short. Thereby, the touch panel 310 can provide a touch panel that allows touch input with high resolution.

For easier description, the first ferromagnetic layer 10, the intermediate layer 30, and the second ferromagnetic layer are referred to as a "sensor unit stacked body" as appropriate.

In the sensor unit 50, for example, one of the first ferromagnetic layer 10 or the second ferromagnetic layer 20 is a magnetization free layer. The other of the first ferromagnetic layer 10 or the second ferromagnetic layer 20 is, for example, a magnetization fixed layer. However, as described later, both of the first ferromagnetic layer 10 and the second ferromagnetic layer 20 may be magnetization free layers.

In the following, examples of the operation of the sensor unit 50 are described using the case where the first ferromagnetic layer 10 is a magnetization fixed layer and the second ferromagnetic layer 20 is a magnetization free layer. In the sensor unit 50, the "inverse magnetostrictive effect" possessed by a ferromagnetic material and the "MR effect" exhibited in the sensor unit stacked body are utilized.

In the "MR effect," a bias current is passed through the sensor unit stacked body. When the direction of the magnetization of the sensor unit sacked body in this state, for example due to the application of an external magnetic field to the sensor, a change in the relative magnetization angle between the first ferromagnetic layer 10 and the second ferromagnetic layer 20 in the sensor is read out as an electric resistance change. Thereby, the sensor unit stacked body functions as a magnetic field sensor. The MR effect like this is used in HDD heads.

In the touch panel 310 according to the embodiment, the inverse magnetostrictive effect is used in addition to the MR effect. The inverse magnetostrictive effect is a phenomenon in which the magnetization direction of a magnetic material changes when it is subjected to mechanical stress. For example, a tensile stress is applied to the sensor unit stacked body based on the stress applied to the sensor unit 50. When the direction of the magnetization of the second ferromagnetic layer 20 (magnetization free layer) and the direction of the tensile stress applied to the second ferromagnetic layer 20 are different (assuming an appropriate sign of the magnetostrictive coefficient), the magnetization direction of the sensor unit stacked body changes due to the inverse magnetostriction effect, and the MR effect appears in accordance with the magnetization change. The amount of electric resistance change due to the MR effect is the "MR change amount." The value of the MR change amount divided by the electric resistance value is referred to as the "MR ratio."

Figure 3A:
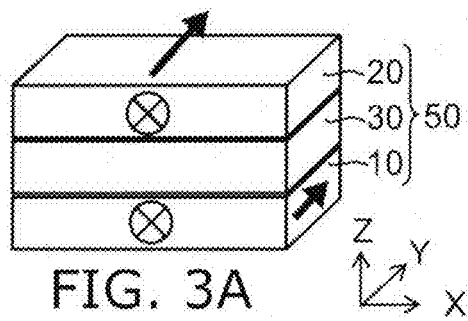
FIG. 3A to FIG. 3C are schematic perspective views showing operations of the touch panel according to the first embodiment.
Figure 3B:
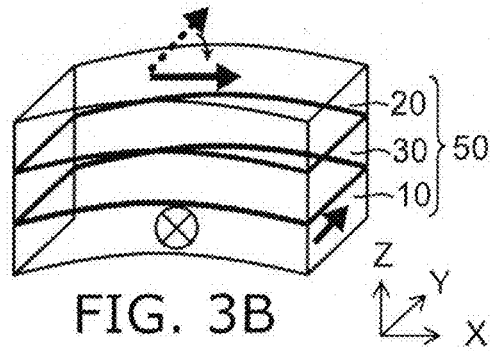
Figure 3C:
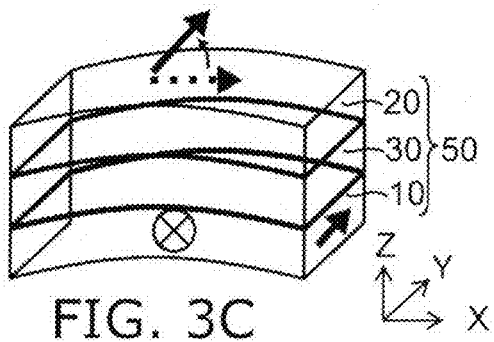

FIG. 3A to FIG. 3C are schematic perspective views illustrating operations of the touch panel according to the first embodiment.

The drawings illustrate states of the sensor unit 50. The drawings illustrate relationships between the direction of the magnetization in the sensor unit stacked body and the direction of the tensile stress.

FIG. 3A shows a state where no tensile stress is applied. At this time, in the example, the direction of the magnetization of the first ferromagnetic layer 10 (magnetization fixed layer) is the same as the direction of the magnetization of the second ferromagnetic layer 20 (magnetization free layer).

FIG. 3B shows a state where a tensile stress is applied. In the example, a tensile stress is applied along the X-axis direction. For example, an external pressure is applied to the sensor unit stacked body along the Z-axis direction, and as a result of the deformation, a tensile stress now exists along the X-axis direction. That is, the tensile stress is created in the direction orthogonal to the directions of the magnetizations of the first ferromagnetic layer 10 (magnetization fixed layer) and the second ferromagnetic layer 20 (magnetization free layer) (in the example, the Y-axis direction). At this time, the magnetization of the second ferromagnetic layer 20 (magnetization free layer) rotates towards or to become the same direction as the direction of the tensile stress. This is referred to as the "inverse magnetostriction effect." At this time, the magnetization of the first ferromagnetic layer 10 (magnetization fixed layer) is fixed. Therefore, by the rotation of the magnetization of the second ferromagnetic layer 20 (magnetization free layer), the relative angle between the direction of the magnetization of the first ferromagnetic layer (magnetization fixed layer) and the direction of the magnetization of the second ferromagnetic layer 20 (magnetization free layer) has been altered.

In the drawing, the direction of the magnetization of the first ferromagnetic layer 10 (magnetization fixed layer) is illustrated as an example, and the direction of the magnetization may not be the direction illustrated in the drawing.

In the inverse magnetostrictive effect, the easy axis of magnetization varies with the sign of the magnetostrictive coefficient of a ferromagnetic material. In many materials that exhibit large inverse magnetostrictive effects, the magnetostrictive constant has a positive sign. In the case where the magnetostrictive coefficient is of a positive sign, the direction in which a tensile stress is applied is the magnetization easy axis as in the case described above. At this time, as mentioned above, the magnetization of the second ferromagnetic layer 20 (magnetization free layer) rotates to the direction of the magnetization easy axis.

For example, in the case where the magnetostrictive coefficient of the second ferromagnetic layer 20 (magnetization free layer) is positive, the direction of the magnetization of the second ferromagnetic layer 20 (magnetization free layer) is set to a direction different from the direction in which the tensile stress is applied.

On the other hand, in the case where the magnetostrictive coefficient is negative, a direction perpendicular to the direction in which a tensile stress is applied is the magnetization easy axis.

FIG. 3C illustrates a state where the magnetostrictive coefficient is negative. In this case, the direction of the magnetization of the second ferromagnetic layer 20 (magnetization free layer) is set to a direction different from the direction perpendicular to the direction in which the tensile stress is applied (in the example, the X-axis direction).

In the drawing, the direction of the magnetization of the first ferromagnetic layer 10 (magnetization fixed layer) is illustrated as an example, and the direction of the magnetization may not be the direction illustrated in the drawing.

The electric resistance of the sensor unit stacked body, Rs, changes due to, for example, the MR effect in accordance with the angle between the magnetization of the first ferromagnetic layer 10 and the magnetization of the second ferromagnetic layer 20.

The magnetostrictive coefficient ($\lambda s$) represents the magnitude of deformation when a ferromagnetic layer is magnetically saturated in a certain direction by applying an external magnetic field. Assuming that the length is L in a state where there is no external magnetic field and changes by $\Delta L$ when an external magnetic field is applied, the magnetostriction constant $\lambda s$ is expressed by $\Delta L/L$. Although the change amount changes with the magnitude of the magnetic field, the magnetostriction constant $\lambda s$ is expressed as $\Delta L/L$ in the state of being magnetically saturated by applying a sufficient magnetic field.

Figure 4:
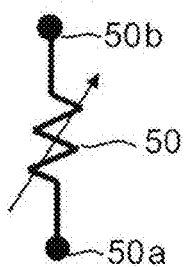
FIG. 4 is an equivalent circuit diagram showing a part of the touch panel according to the first embodiment.

FIG. 4 is an equivalent circuit diagram illustrating a part of the touch panel according to the first embodiment.

As shown in FIG. 4, the sensor unit 50 functions as a variable resistor. That is, the electric resistance Rs between the one end 50a and the other end 50b of the sensor unit 50 may change between the high resistance value Rh and the low resistance value Rl. The electric resistance Rs changes in accordance with the stress applied to the sensor unit 50.

The control unit 101 sequentially selects the first interconnections 110 and senses the electric resistance Rs of the sensor unit 50 at that time via the second interconnection 120, for example. Thereby, touch input can be read with high resolution.

Thus, for a sensor in a certain position, there is a case where whether stress is applied or not is determined in a digital manner, and there is also a case where the magnitude of the stress is determined in an analog manner because the value of the resistance changes continuously in accordance with the magnitude of the stress in each sensor. What is simple from the circuit point of view is digital usage, in which only the presence or absence of stress is determined, but depending on the use, it is also possible to add a circuit in which also the magnitude of the stress is determined in an analog manner from each sensor.

The sensor unit 50 may further include a rectifying element (e.g. a diode) stacked with the sensor unit stacked body. This realizes suppressing influence of current applied to another sensor unit except for the sensor unit 50, and enables to sense with higher accuracy.

In the case where, for example, the first ferromagnetic layer 10 is a magnetization fixed layer, a CoFe alloy, a CoFeB alloy, a NiFe alloy, and the like, may be used for the first ferromagnetic layer 10. The thickness of the first ferromagnetic layer 10 is, for example, not less than 2 nanometers (nm) and not more than 8 nm.

A metal or an insulator may be used for the intermediate layer 30. As the metal, for example, Cu, Au, Ag, and the like may be used. In the case of the metal, the thickness of the intermediate layer 30 is, for example, not less than 1 nm and not more than 7 nm. As the insulator, for example, a magnesium oxide (MgO etc.), an aluminum oxide ($Al_2O_3$ etc.), a titanium oxide (TiO etc.), and a zinc oxide (ZnO etc.) may be used. In the case of the insulator, the thickness of the intermediate layer 30 is, for example, not less than 0.6 nm and not more than 2.5 nm.

Furthermore, as the intermediate layer 30, a CCP (current-confined-path) intermediate layer may be used in which a layer of an insulator like the above is partly provided with a large number of metal current paths penetrating through the layer. The width (the length parallel to the layer) of the metal current path is, for example, not less than 0.5 nm and not more than 10 nm. More specifically, it is not less than 1 nm and not more than 7 nm. For example, a configuration in which a current path structure containing Cu, Au, Ag, Ni, Fe, Co, or the like is formed in a part of an aluminum oxide ($Al_2O_3$ etc.) may be used for the intermediate layer 30. The thickness of the intermediate layer 30 in this case is, for example, not less than 1 nm and not more than 3 nm.

In the case where the second ferromagnetic layer 20 is a magnetization free layer, for example, a FeCo alloy, a NiFe alloy, and the like may be used for the second ferromagnetic layer 20. In addition, for the second ferromagnetic layer 20, an Fe—Co—Si—B alloy, a Tb-M-Fe alloy exhibiting $\lambda s>100$ ppm (M is Sm, Eu, Gd, Dy, Ho, and/or Er), a Tb-M1-Fe-M2 alloy (M1 is Sm, Eu, Gd, Dy, Ho, and/or Er, and M2 is Ti, Cr, Mn, Co, Cu, Nb, Mo, W, and/or Ta), an Fe-M3-M4-B alloy (M3 is Ti, Cr, Mn, Co, Cu, Nb, Mo, W, and/or Ta, and M4 is Ce, Pr, Nd, Sm, Tb, Dy, and/or Er), Ni, Al—Fe, a ferrite ($Fe_3O_4$, $(FeCo)_3O_4$, etc.), and the like may be used. The thickness of the second ferromagnetic layer 20 is, for example, not less than 2 nm.

The second ferromagnetic layer 20 may have a two-layer structure. In this case, the second ferromagnetic layer 20 may include a layer of a FeCo alloy and the following layer stacked with the layer of a FeCo alloy. What is stacked with the layer of an FeCo alloy is a layer of a material selected from an Fe—Co—Si—B alloy, a Tb-M-Fe alloy exhibiting $\lambda s>100$ ppm (M is Sm, Eu, Gd, Dy, Ho, and/or Er), a Tb-M1-Fe-M2 alloy (M1 is Sm, Eu, Gd, Dy, Ho, and/or Er, and M2 is Ti, Cr, Mn, Co, Cu, Nb, Mo, W, and/or Ta), an Fe-M3-M4-B alloy (M3 is Ti, Cr, Mn, Co, Cu, Nb, Mo, W, and/or Ta, and M4 is Ce, Pr, Nd, Sm, Tb, Dy, and/or Er), Ni, Al—Fe, a ferrite ($Fe_3O_4$, $(FeCo)_3O_4$, etc.), and the like.

For the first electrode 51 and the second electrode 52, for example, Au, Cu, Ta, Al, and the like that are nonmagnetic materials may be used. By using a soft magnetic material as the first electrode 51 and the second electrode 52, magnetic noise from the outside that influences the sensor unit stacked body can be reduced. As the soft magnetic material, for example, a permalloy (a NiFe alloy) and silicon steel (an FeSi alloy) may be used. The sensor unit 50 is covered with an insulator such as an aluminum oxide (e.g. $Al_2O_3$) or a silicon oxide (e.g. $SiO_2$) in order to ensure insulation from the surroundings.

In the case where, for example, the intermediate layer 30 is a metal, the GMR (giant magnetoresistance) effect appears. In the case where the intermediate layer 30 is an insulator, the TMR (tunneling magnetoresistance) effect appears. In the sensor unit 50, for example, the CPP (current perpendicular to plane)-GMR effect that passes a current along the stacking direction of the sensor unit stacked body, for example, is used. Also in the case of a CCP intermediate layer, the CPP-GMR effect is used as a phenomenon.

Thus, in the embodiment, the MR phenomenon in the sensor unit 50 is used. In addition to the MR phenomenon, the inverse magnetostrictive phenomenon is used in order to change the magnetization of the sensor unit. Utilizing the two phenomena enables sensing with very high sensitivity to strain. In the case of using the inverse magnetostrictive effect, for example, the magnetization direction of at least one ferromagnetic layer of the first ferromagnetic layer 10 and the second ferromagnetic layer 20 is changed with respect to the strain applied from the outside. The relative angle between the magnetizations of the two ferromagnetic layers changes with the presence or absence of strain created by external pressure. Since the electric resistance Rs changes with the strain applied from the outside, the sensor unit 50 functions as a strain or pressure sensor.

That is, the magnetization direction of at least one ferromagnetic layer of the first ferromagnetic layer 10 and the second ferromagnetic layer 20 changes in accordance with the stress. The absolute value of the magnetostrictive coefficient of at least one ferromagnetic layer (the ferromagnetic layer in which the magnetization direction changes in accordance with the stress) is set to, for example, not less than $\lambda s = 10^{-5}$. Therefore, by the inverse magnetostrictive effect, the direction of the magnetization changes in accordance with the strain produced by the external pressure. For at least one of the first ferromagnetic layer 10 and the second ferromagnetic layer 20, for example, a metal such as Fe, Co, and Ni, an alloy including them, or the like is used. The magnetostrictive coefficient is determined largely depending on the use element, additive element, etc.

An oxide such as MgO, for example, is used as the intermediate layer 30. A magnetic layer on an MgO layer generally has a positive magnetostrictive coefficient. For example, in the case where the second ferromagnetic layer 20 is formed on the intermediate layer 30, a magnetization free layer with a stacked configuration of CoFeB/CoFe/NiFe is used as the second ferromagnetic layer 20. When the uppermost NiFe layer is made Ni-rich, the magnetostrictive coefficient of the NiFe layer is negative and the absolute value thereof is large. To suppress cancellation of the positive magnetostriction on the oxide layer, the Ni content of the uppermost NiFe layer is not made more Ni-rich than the Ni content ratio (atomic percent; atomic %) of the standard composition $Ni_{81}Fe_{19}$ of permalloy known as a common NiFe alloy material. Specifically, the ratio of Ni in the uppermost NiFe layer is preferably less than 80 atomic %. In the case where a magnetization free layer is used as the second ferromagnetic layer 20, the thickness of the second ferromagnetic layer 20 is preferably not less than 1 nm and not more than 20 nm, for example.

In the case where the second ferromagnetic layer 20 is a magnetization free layer, the first ferromagnetic layer 10 may be either a magnetization fixed layer or a magnetization free layer. In the case where the first ferromagnetic layer 10 is a magnetization fixed layer, the direction of the magnetization of the first ferromagnetic layer 10 does not substantially change even if it is under strain. The electric resistance Rs changes with the angle of the relative magnetization between the first ferromagnetic layer 10 and the second ferromagnetic layer 20. The presence or absence of strain is sensed by the difference in the electric resistance Rs.

In the case where both of the first ferromagnetic layer 10 and the second ferromagnetic layer 20 are magnetization free layers, for example, the magnetostriction constant of the first ferromagnetic layer 10 is set different from the magnetostriction constant of the second ferromagnetic layer 20.

Both in the case where the first ferromagnetic layer 10 is a magnetization fixed layer and in the case where it is a magnetization free layer, the thickness of the first ferromagnetic layer 10 is preferably not less than 1 nm and not more than 20 nm, for example.

In the case where, for example, the first ferromagnetic layer 10 is a magnetization fixed layer, a synthetic AF structure using a stacked structure of an antiferromagnetic layer/a magnetic layer/a Ru layer/a magnetic layer and the like, for example, may be used for the first ferromagnetic layer 10. IrMn and the like, for example, are used for the antiferromagnetic layer. In the case where the first ferromagnetic layer 10 is a magnetization fixed layer, instead of using the antiferromagnetic layer, a configuration using a magnetically hard film may be used for the first ferromagnetic layer 10. CoPt, FePt, and the like, for example, are used for the hard film.

The magnetization orientation of a magnetic layer is used for the sensor unit 50. A very small size is sufficient for the area necessary for the sensor unit 50. Approximately 50 nm×50 nm to 50 μm×50 μm or less, for example, are sufficient for the area of the sensor unit 50.

FIG. 5A to FIG. 5D are schematic perspective views illustrating a part of the touch panel according to the first embodiment.

Figure 5A:
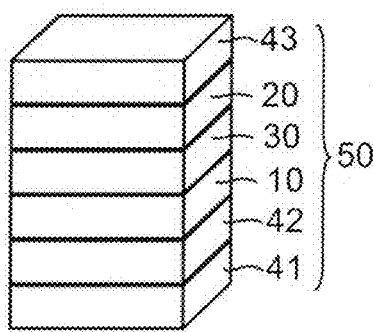
FIG. 5A to FIG. 5D are schematic perspective views showing a part of the touch panel according to the first embodiment.

In the example shown in FIG. 5A, an underlayer 41, an antiferromagnetic layer 42, the first ferromagnetic layer 10 (magnetization fixed layer), the intermediate layer 30, the second ferromagnetic layer 20 (magnetization free layer), and a protection layer 43 are stacked in this order in the sensor unit 50. The configuration is called, for example, a bottom-type spin valve film.

The underlayer 41 increases the crystal orientation properties of a film stacked on the underlayer 41, for example. A material having a buffer effect such as amorphous Ta, for example, may be used for the underlayer 41. Amorphous Ta has, for example, high adhesion to a substrate. For the underlayer 41, Ru, NiFe, Cu, and the like having the effect of seeding a crystalline material may be used to be stacked with these materials having a buffer effect. By using a single layer or a stacked film of these materials as the underlayer 41, the crystal orientation properties of a layer formed on the underlayer 41 can be improved. By employing a stacked structure of an amorphous Ta film and a crystalline film of Ru, NiFe, Cu, and the like, wettability and crystal orientation properties can be balanced well. The thickness of the underlayer 41 is, for example, not less than 0.5 nm and not more than 5 nm.

The protection layer 43 protects the sensor unit stacked body from damage during the manufacturing of the sensor unit stacked body. A film of Cu, Ta, Ru, and the like or a stacked film of them, for example, may be used for the protection layer 43. The thickness of the protection layer 43 is, for example, not less than 1 nm and not more than 20 nm.

Figure 5B:
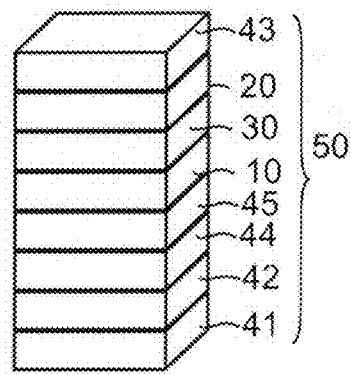

In the example shown in FIG. 5B, the underlayer 41, the antiferromagnetic layer 42, a magnetization fixed layer 44, an antiparallel coupling layer 45, the first ferromagnetic layer 10 (magnetization fixed layer), the intermediate layer 30, the second ferromagnetic layer 20 (magnetization free layer), and the protection layer 43 are stacked in this order. The configuration is called, for example, a bottom-type synthetic valve film. The configuration can enhance the fixing strength of the magnetization of the first ferromagnetic layer 10 (magnetization fixed layer).

The magnetization of the magnetization fixed layer 44 is fixed in one direction by an exchange coupling from the antiferromagnetic layer 42. The same material as the material used for the first ferromagnetic layer 10 (magnetization fixed layer) may be used for the magnetization fixed layer 44.

The antiparallel coupling layer 45 couples the magnetization of the first ferromagnetic layer 10 (magnetization fixed layer) and the magnetization of the magnetization fixed layer 44 in an antiparallel manner. The configuration can strengthen the fixed magnetic field of the magnetization of the first ferromagnetic layer 10 (magnetization fixed layer) even if the exchange coupling energy from the antiferromagnetic layer 42 is constant. Therefore, the influence of magnetic noise applied to the sensor unit stacked body can be reduced. Ru, Ir, and the like, for example, may be used for the antiparallel coupling layer 45. The thickness of the antiparallel coupling layer 45 is, for example, not less than 0.8 nm and not more than 1 nm.

Figure 5C:
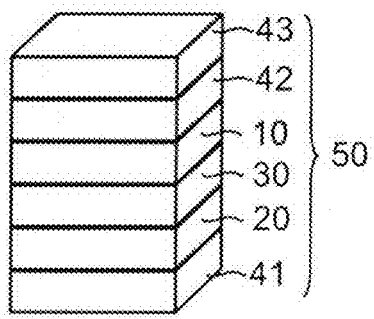

In the example shown in FIG. 5C, the underlayer 41, the second ferromagnetic layer 20 (magnetization free layer), the intermediate layer 30, the first ferromagnetic layer 10 (magnetization fixed layer), the antiferromagnetic layer 42, and the protection layer 43 are stacked in this order. The configuration is called, for example, a top-type spin valve film.

Figure 5D:
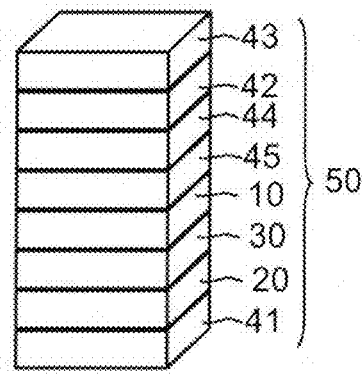

In the example shown in FIG. 5D, the underlayer 41, the second ferromagnetic layer 20 (magnetization free layer), the intermediate layer 30, the first ferromagnetic layer 10 (magnetization fixed layer), the antiparallel coupling layer 45, the magnetization fixed layer 44, the antiferromagnetic layer 42, and the protection layer 43 are stacked in this order. The configuration is called, for example, a top-type synthetic spin valve film.

The layers included in the top-type spin valve film and the top-type synthetic spin valve film are similar to the layers included in the bottom-type spin valve film and the bottom-type synthetic spin valve film, and a description is therefore omitted.

As a method for keeping the magnetization of the second ferromagnetic layer 20 in a different direction from the tensile stress, there is a method using an interlayer coupling with the magnetization of the first ferromagnetic layer 10. An interlayer coupling works so that the magnetization of the second ferromagnetic layer 20 may be uniformly directed parallel to the magnetization of the first ferromagnetic layer 10 when the intermediate layer 30 is not more than 3 nm in the case of a metal and not more than 1.5 nm in the case of an insulator. Thus, by fixing the magnetization of the first ferromagnetic layer 10 in a different direction from the tensile stress, the magnetization of the second ferromagnetic layer 20 can be directed to the same direction by weak force of the interlayer coupling.

The magnetization of the second ferromagnetic layer 20 can be kept in one direction also by applying a magnetic field when forming the second ferromagnetic layer 20 (magnetization free layer) by deposition with a sputtering apparatus. It is preferable to perform deposition using the sputtering method while applying a magnetic field in a different direction from the tensile stress because the magnetization is easily directed to the direction of the magnetic field in the deposition.

Figure 6A:
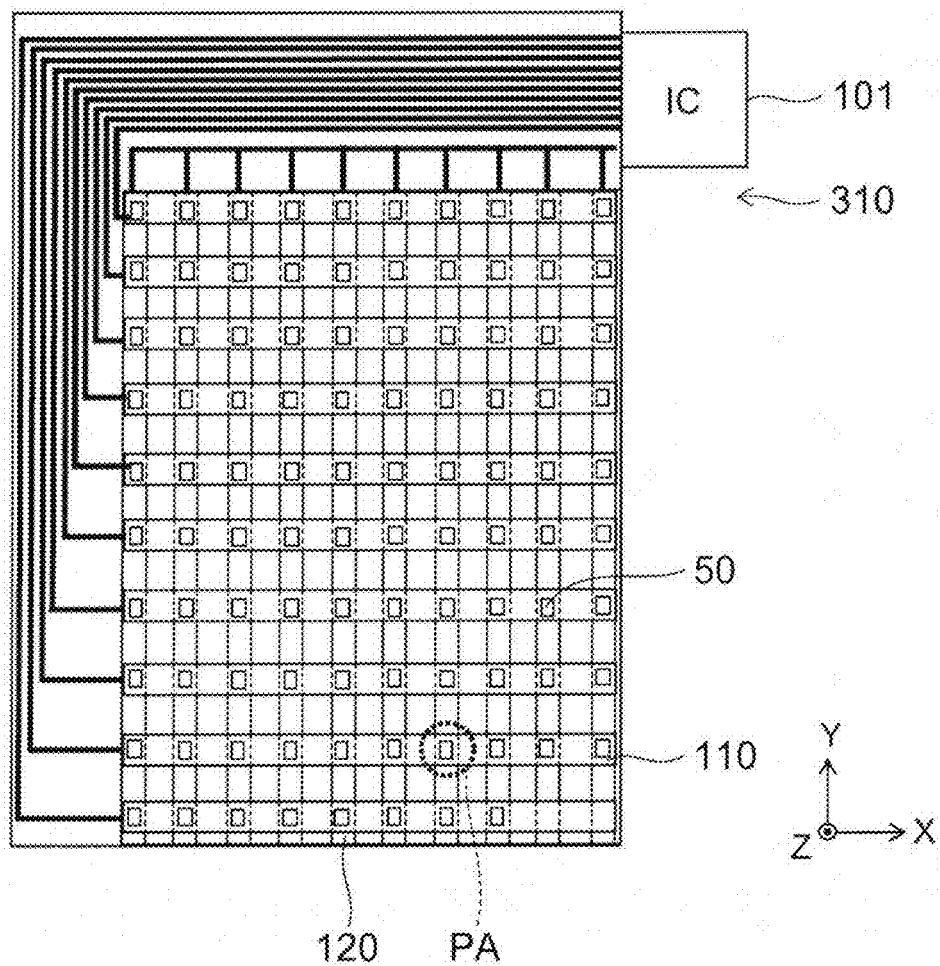
FIG. 6A and FIG. 6B are schematic views showing the configuration of the touch panel according to the first embodiment.
Figure 6B:
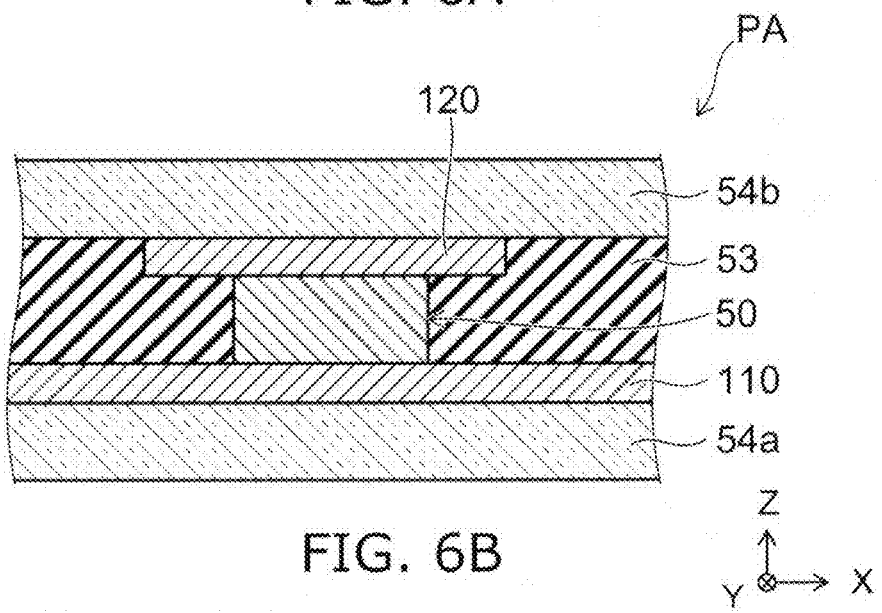

FIG. 6A and FIG. 6B are schematic views illustrating the configuration of the touch panel according to the first embodiment.

FIG. 6A is a schematic plan view. FIG. 6B is a schematic cross-sectional view of a part PA of FIG. 6A.

As shown in FIG. 6A, the first interconnection 110 extends along the X-axis direction, and the second interconnection 120 extends along the Y-axis direction. The sensor unit 50 is provided at the intersection of the first interconnection 110 and the second interconnection 120. The first interconnection 110 and the second interconnection 120 are connected to the control unit 101 (IC).

As shown in FIG. 6B, the first interconnection 110 is provided on a base 54a (e.g. a glass substrate etc.). The sensor unit 50 is provided on the first interconnection 110. The second interconnection 120 is provided on the sensor unit 50. An insulating layer 53 is provided around the sensor unit 50. An aluminum oxide (e.g. $Al_2O_3$) layer, a silicon oxide (e.g. $SiO_2$) layer, and the like, for example, are used for the insulating layer 53. A cover layer 54b is provided on the second interconnection 120 and on the insulating layer 53. A material transmissibe to visible light, for example, is used for the base 54a and the cover layer 54b.

Such a configuration can provide a touch panel that allows touch input with high resolution. However, the embodiment is not limited to the configuration illustrated in FIG. 6A and FIG. 6B but may be variously modified.

For example, in FIG. 6A, of the first interconnection 110 and the second interconnection 120, the electric potential of the first interconnection 110 is variable for each first interconnection 110, and the plurality of second interconnections 120 are set at a common potential. The embodiment is not limited thereto, and also the second interconnection 120 may be configured such that the electric potential is variable for each second interconnection 120.

Second Embodiment

Figure 7:
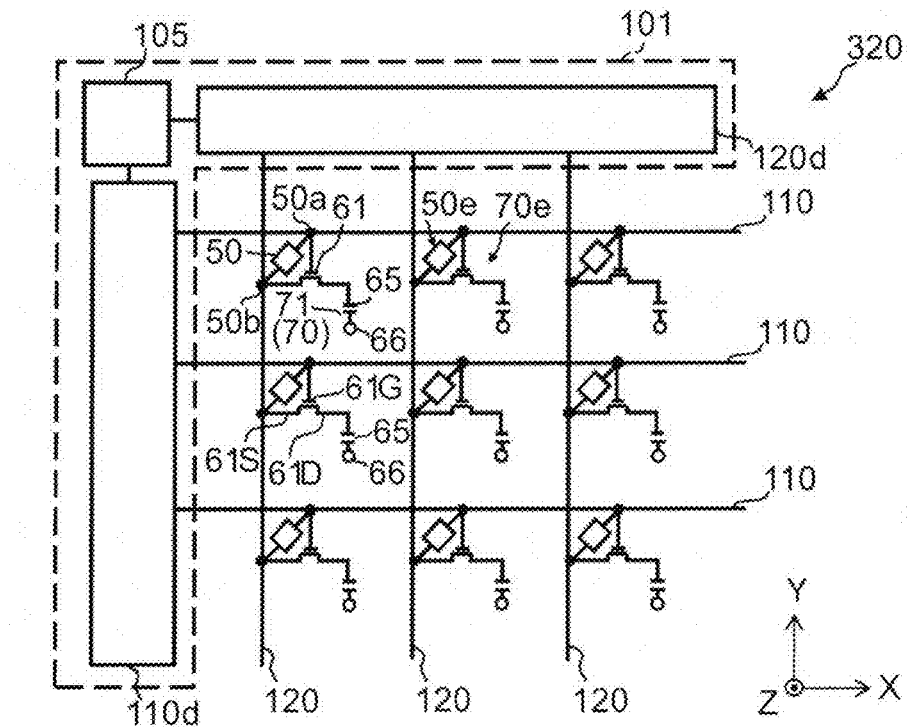
FIG. 7 is a schematic diagram showing the configuration of a display device according to a second embodiment.

FIG. 7 is a schematic diagram illustrating the configuration of a display device according to a second embodiment.

As shown in FIG. 7, a display device 320 according to the embodiment includes the touch panel 310 described in regard to the first embodiment, a plurality of first transistors 61, a plurality of pixel electrodes 65, and an optical layer 70.

Each of the plurality of first transistors 61 is provided in an interconnection portion between each of the plurality of first interconnections 110 and each of the plurality of second interconnections 120.

Each of the plurality of pixel electrodes 65 is provided in each of the interconnection portions. Each of the plurality of pixel electrodes 65 is directly or indirectly connected to one end of each of the plurality of first transistors 61. The one end of the first transistor 61 is one of the source and the drain of the first transistor 61. The other end of the first transistor 61 is the other of the source and the drain of the first transistor 61. In the following, a description is given on the assumption that the one end of the first transistor 61 is the drain of the first transistor 61. That is, the pixel electrode 65 is directly or indirectly connected to the drain of the first transistor 61.

In the specification of this application, "directly connected" includes a state of being electrically connected via no other conductive member (e.g. a via electrode, an interconnection, etc.). "Indirectly connected" includes a state of being electrically connected via another conductive member (e.g. a via electrode, an interconnection, etc.) and a state of being connected via a switch (e.g. a transistor, etc.) to enable switching between conduction and non-conduction.

The optical layer 70 emits light or changes its optical properties, including at least one of birefringence, optical rotation, scattering, diffraction, and absorption, based on the charge supplied to the pixel electrode 65, via the first transistor 61.

In the example, the optical layer 70 includes a liquid crystal. That is, a liquid crystal layer 71 is used as the optical layer 70. That is, the display device 320 is a liquid crystal display device having a touch panel function.

One pixel electrode 65 forms one display pixel 70e for displaying.

In the example, the gate of each of the plurality of first transistors 61 is connected to each of the plurality of first interconnections 110. The other end (in the example, the source) of each of the plurality of first transistors 61 is connected to each of the plurality of second interconnections 120.

That is, in the display device 320, the first interconnection 110 for sensing the touch-type contact of the touch panel 310 is used as a scan line for displaying. The second interconnection 120 for sensing the touch-type contact of the touch panel 310 is used as a signal line for displaying.

The control unit 101 writes a desired charge to the pixel electrode 65 via the first interconnection 110, the second interconnection 120, and the first transistor 61. A voltage generated between the pixel electrode 65 and a counter electrode 66 is applied to the optical layer 70 (the liquid crystal layer 71) based on the charge written. In accordance with the voltage, the optical properties (including at least one of birefringence, optical rotation, scattering, diffraction, and absorption) of the liquid crystal layer 71 may change. Thereby, the pixel may be in a bright or dark state and thus the display is formed.

Figure 8:
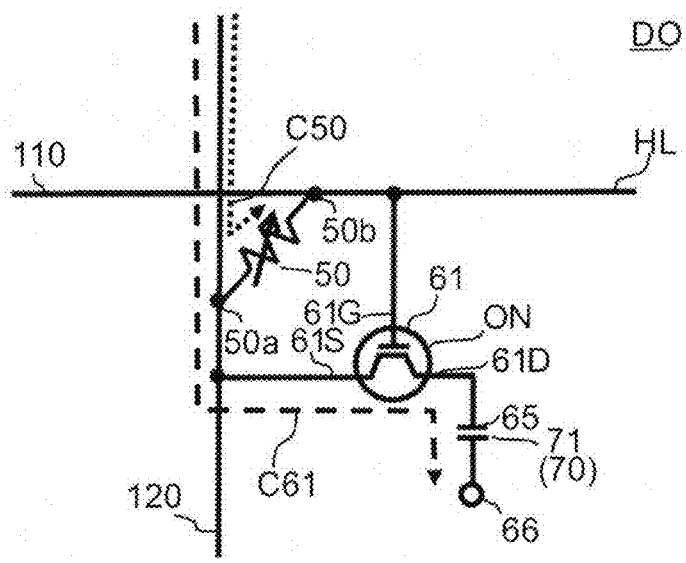
FIG. 8 is a schematic diagram showing an operation of the display device according to the second embodiment.

FIG. 8 is a schematic diagram illustrating an operation of the display device according to the second embodiment.

FIG. 8 illustrates a display operation DO in the display device 320.

A first gate 61G of the first transistor 61 is connected to the first interconnection 110, a first drain 61D of the first transistor 61 is connected to the pixel electrode, and a first source 61S of the first transistor 61 is connected to the second interconnection 120. The sensor unit 50 is connected in parallel to the first gate 61G and the first source 61S.

In the display operation DO, one of the plurality of first interconnections 110 is set in a high state HL (the selection state). The first transistor 61 is turned to the ON state (the conductive state). A charge (a current C61) is supplied to the pixel electrode 65 via the second interconnection 120 and the first transistor 61. A voltage based on the charge (the voltage between the pixel electrode 65 and the counter electrode 66) is applied to the liquid crystal layer 71 (the optical layer 70). The voltage applied to the liquid crystal layer 71 changes with the amount of the charge, and the intensity of light is modulated. The plurality of first interconnections 110 are sequentially scanned and selected; thereby, the display of the entire screen is formed.

In the display operation DO like this, if the resistance of the sensor unit 50 is excessively low, the charge supplied from the second interconnection 120 will flow to the first interconnection 110 via the sensor unit 50 (a current C50), and a desired charge will not be supplied to the pixel electrode 65. Consequently, a desired display state cannot be obtained. To suppress such a phenomenon, the electric resistance Rs of the sensor unit 50 is not set excessively low.

That is, the low resistance value Rl out of the changing electric resistances Rs of the sensor unit 50 is set higher than the electric resistance $R_{TFTon}$ between one end (e.g. the first drain 61D) and the other end (e.g. the first source 61S) of the first transistor 61 when the portion between the one end (e.g. the first drain 61D) and the other end (e.g. the first source 61S) of the first transistor 61 is in the conduction state (the ON state). Furthermore, the low resistance value Rl is set higher than the electric resistance between the first gate 61G and the first source 61S of the first transistor 61 when the first transistor 61 is in the conduction state. Thereby, a desired display state is obtained.

Figure 9:
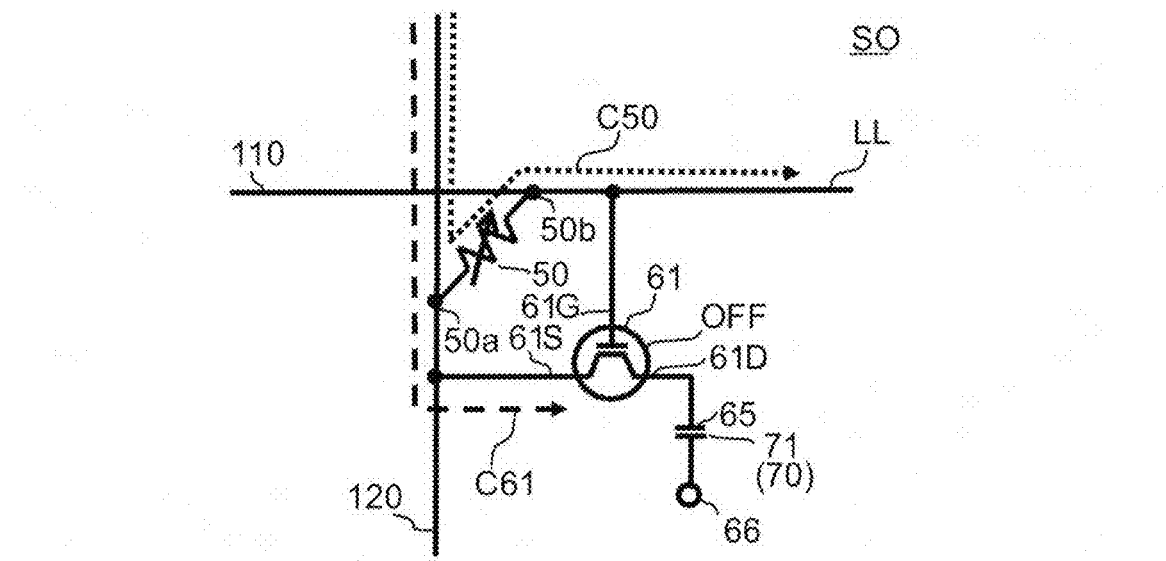
FIG. 9 is a schematic diagram showing an operation of the display device according to the second embodiment.

FIG. 9 is a schematic diagram illustrating an operation of the display device according to the second embodiment.

FIG. 9 illustrates a sensing operation SO in the display device 320.

In the sensing operation SO, one of the plurality of first interconnections 110 is set in a low state LL, and at this time a current (the current C50) flowing between the second interconnection 120 and the first interconnection 110 via the sensor unit 50 is sensed. Thereby, the electric resistance Rs of the sensor unit 50 is sensed. The plurality of first interconnections 110 are sequentially scanned and selected; thereby, the sensing in the entire input surface (screen) is performed.

In the sensing operation SO like this, if the resistance of the sensor unit 50 is excessively high, the current flowing through the second interconnection 120 will flow to the pixel electrode 65 via the first transistor 61 (the current C61) to affect the electric potential of the pixel electrode 65; and the display state will change and power loss may be caused. If the current flowing through the sensor unit 50 is excessively small, it becomes difficult to sense the resistance of the sensor unit 50. To suppress such a phenomenon, the electric resistance Rs of the sensor unit 50 is not set excessively high.

That is, the high resistance value Rh out of the changing electric resistances Rs of the sensor unit 50 is set lower than the electric resistance $R_{TFToff}$ between one end (e.g. the first drain 61D) and the other end (e.g. the first source 61S) of the first transistor 61 when the portion between the one end (e.g. the first drain 61D) and the other end (e.g. the first source 61S) of the first transistor 61 is in the non-conduction state. Thereby, a desired display state can be maintained, and a desired sensing operation can be performed.

The electric resistance $R_{TFTon}$ when the first transistor 61 is in the conduction state is, for example, approximately 1 megaohm (MΩ). Therefore, the low resistance value Rl of the sensor unit 50 is preferably higher than 1 MΩ. There is more preferably a difference of one order of magnitude or more between the electric resistance $R_{TFTon}$ and the low resistance value Rl. Therefore, the low resistance value Rl of the sensor unit 50 is more preferably not less than 10 MΩ.

The electric resistance $R_{TFToff}$ when the first transistor 61 is in the non-conduction state is, for example, approximately 1 teraohm (TΩ). Therefore, the high resistance value Rh of the sensor unit 50 is preferably lower than 1 TΩ. There is more preferably a difference of one order of magnitude or more between the electric resistance $R_{TFToff}$ and the high resistance value Rh. Therefore, the high resistance value Rh of the sensor unit 50 is more preferably not more than 100 GΩ.

By using, for example, a TMR element configuration in which an insulating material is used for the intermediate layer 30 of the sensor unit 50, a configuration in which the electric resistance Rs changes within a range like the above can be easily obtained. By using an MgO film as the intermediate layer 30, a high MR ratio and a resistance change ratio in such a range can be obtained. The thickness of the MgO film is preferably not less than 1 nm and not more than 3 nm.

The operations described in regard to FIG. 8 and FIG. 9 are performed by the control unit 101. That is, the control unit 101 senses the change of the electric resistance Rs in the sensor unit 50 in the sensing operation SO, and further supplies a charge to the pixel electrode using an electric signal supplied to the second interconnection 120, while controlling the conduction and non-conduction of the first transistor using an electric signal supplied to the first interconnection 110, in the display operation DO. Thereby, the sensing operation SO and the display operation DO can be efficiently performed.

In the embodiment, the sensor unit 50 functions as a resistance change-type strain sensor using magnetization reorientation. Using the sensor unit 50 according to the embodiment, a strain sensitivity, $\alpha$, of not less than approximately 1000 can be easily obtained. The strain sensitivity, $\alpha$, is expressed by $\alpha=(\Delta R/Rmin)/\epsilon$. Rmin is the resistance with a low value in the sensor, and $\Delta R$ is the amount of resistance change due to the application of an external strain. $\epsilon$ is the strain, and $\epsilon=\Delta L/L$. Here, assuming that the length when no external pressure is applied is L, the amount of length change due to the application of an external pressure is denoted by $\Delta L$. In other words, $\epsilon$ is the ratio of deformation amount. The strain sensitivity $\alpha$ expresses the resistance change amount ratio per unit strain. In the case of a Si piezoresistance type used in MEMS sensors etc., the strain sensitivity $\alpha$ is approximately 130 in a single crystal, and 40 or less in a polycrystal. In contrast, in the embodiment, since the MR phenomenon and the inverse magnetostrictive phenomenon are used, a strain sensitivity a with a value of approximately 1000 is relatively easily obtained. Furthermore, since there is no upper limit of properties, there is also a possibility that strain sensitivity $\alpha$ of not less than 10,000 will be obtained in the sensor unit 50 according to the embodiment.

For example, in a piezoresistance-type sensor using Si, the strain sensitivity $\alpha$ is approximately 130. In contrast, in the sensor unit 50 according to the embodiment, a very high strain sensitivity is obtained. In the sensor unit 50 according to the embodiment, the function of a sensor can be sufficiently exhibited with a width of several tens of nanometers. In other words, a significantly small sensor unit 50 as compared to the first transistor 61 can be obtained. Therefore, in the display device 320, a decrease in light utilization rate due to providing the sensor unit 50 is not substantially occured.

On the other hand, for example, there is a touch panel display of what is called an in-cell type in which a capacitance sensing-type sensor is installed in a cell of a display device. In this case, when a sensor (capacitance) and a circuit therefore are installed in a cell, the circuit increases to a size not negligible in comparison to the pixel size. In other words, the region that transmits light (the switching region of light) decreases, and the light transmittance ratio is sacrificed. Consequently, the light utilization rate decreases, and the power consumption of a backlight increases, for example. Another problem, in the case of the capacitance sensing type, is that the response speed of sensing is slow because the problem of the electrical time constant exists. Therefore, if sensing within a prescribed time is necessary, the arrangement density of sensors can be reduced, and consequently the resolution cannot be sufficiently improved. Conversely, for example, if a touch sensitive display with a high position resolution, such as one in which a sensor is provided for all the pixels (all of red, green, and blue), is provided, the sensing operation is slow and thus this is not practical. Hence the number of sensors that can be implemented is limited, and sensors cannot be included for all the high definition pixels In contrast, the size of the sensor unit 50 according to the embodiment is very small as compared to the size of one pixel as described above. Thereby, the aperture ratio is not sacrificed, the light utilization rate does not significantly decrease, and the power consumption can be kept low. Furthermore, since the problem of the electrical time constant, such as with the capacitance type, does not occur in the resistance change type, the response time of the sensor unit 50 is short, and so the total time necessary for sensing is short even if a large number of sensor units 50 are provided. Thereby, a touch panel and a display device that allows touch input with high resolution can be provided. That is, the embodiment can provide an in-cell-type touch panel without loss of the function of a display. There is no decrease in luminance, no increase in power consumption, and no significant increase in cost. A strain sensor can be provided for as many pixels as possible without interfering with light transmission, without limiting the number of pixels, and without increasing power consumption.

Figure 10A:
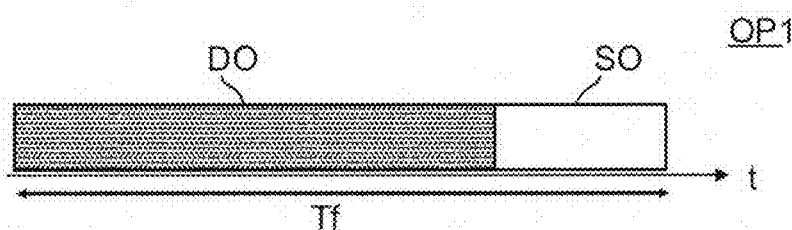
FIG. 10A and FIG. 10B are schematic diagrams showing an operation of the display device according to the second embodiment.
Figure 10B:
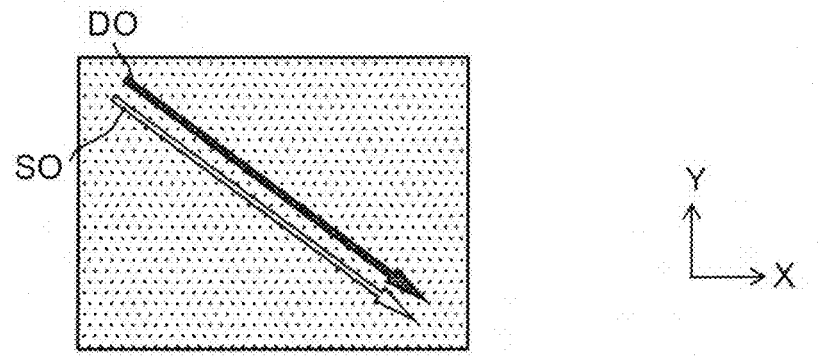

FIG. 10A and FIG. 10B are schematic diagrams illustrating an operation of the display device according to the second embodiment.

FIG. 10A is a time chart showing an example of the operation in the display device 320. FIG. 10B is a schematic view illustrating the drive state of the display screen.

As shown in FIG. 10A, in a frame period Tf corresponding to the driving of one screen, for example, first the display operation DO of one screen is performed, and then the sensing operation SO of one screen (input surface) is performed. That is, in the example, one display operation DO and one sensing operation SO are performed in a frame period Tf.

In this case, as shown in FIG. 10B, the display operation DO of one screen is performed from the top to the bottom of the display screen. Then, the sensing operation SO of one screen (input surface) is performed from the top to the bottom of the display screen (input surface). Such an operation is, for example, the driving method of "write-once." In the method, after the displaying of all the pixels is performed, sensing as a touch panel is performed for all the pixels.

Figure 11A:
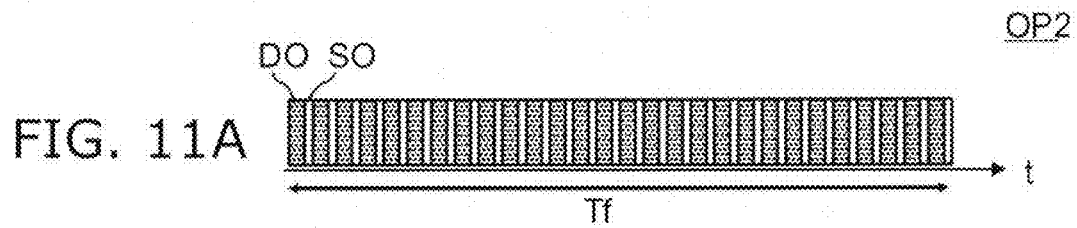
FIG. 11A and FIG. 11B are schematic diagrams showing another operation of the display device according to the second embodiment.
Figure 11B:
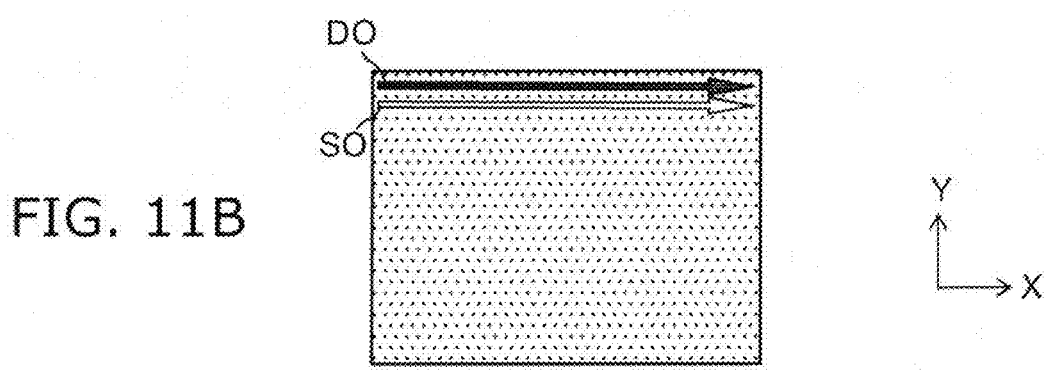

FIG. 11A and FIG. 11B are schematic diagrams illustrating another operation of the display device according to the second embodiment.

FIG. 11A is a time chart showing another example of the operation in the display device 320. FIG. 11B is a schematic view illustrating the drive state of the display screen.

As shown in FIG. 11A, in a frame period Tf corresponding to the driving of one screen, the display operation DO of one line is performed, then the sensing operation SO of one line is performed, and they are repeated. That is, in this operating method, the display operation DO and the sensing operation SO are performed on a line basis.

In this case, as shown in FIG. 11B, the display operation DO is performed in one line of the display screen, and then the sensing operation SO of one line is performed. Such operations are performed from the top to the bottom of the screen (input surface).

Thus, in the embodiment, the driving method is arbitrary and may be variously modified.

In the sensor unit 50 according to the embodiment, since the time necessary for sensing is very short, the sensing operation SO can be performed without substantially influencing the display operation.

Figure 12:
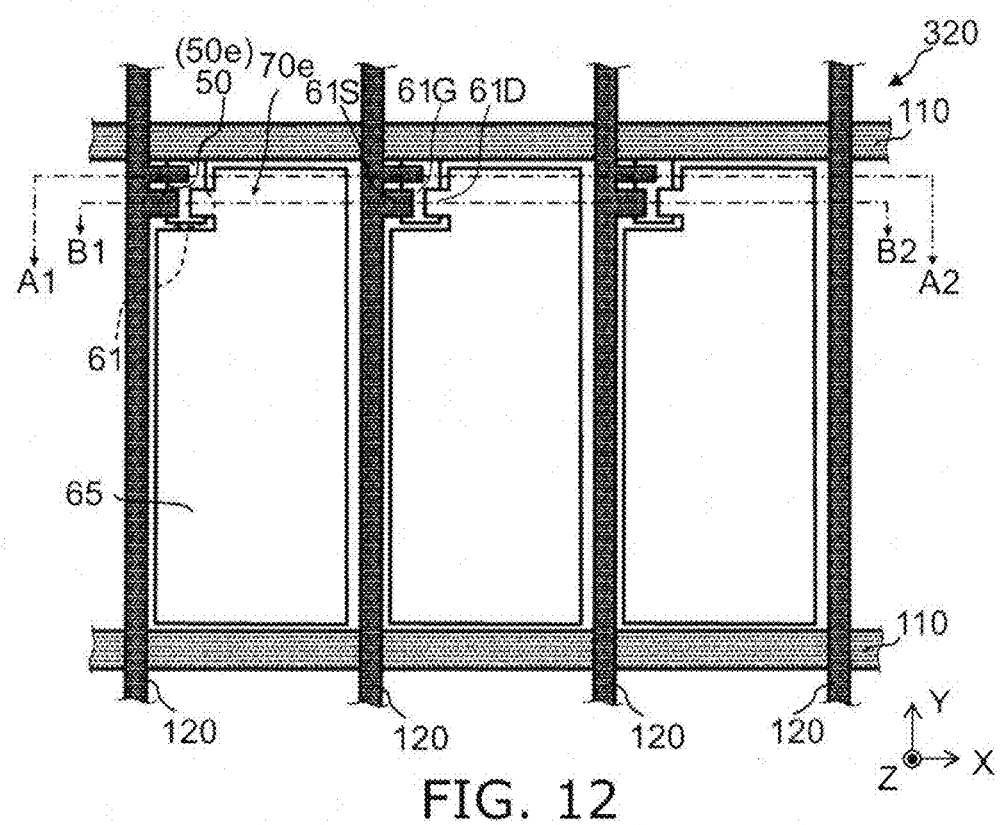
FIG. 12 is a schematic plan view showing the configuration of the display device according to the second embodiment.

FIG. 12 is a schematic plan view illustrating the configuration of the display device according to the second embodiment.

Figure 13A:
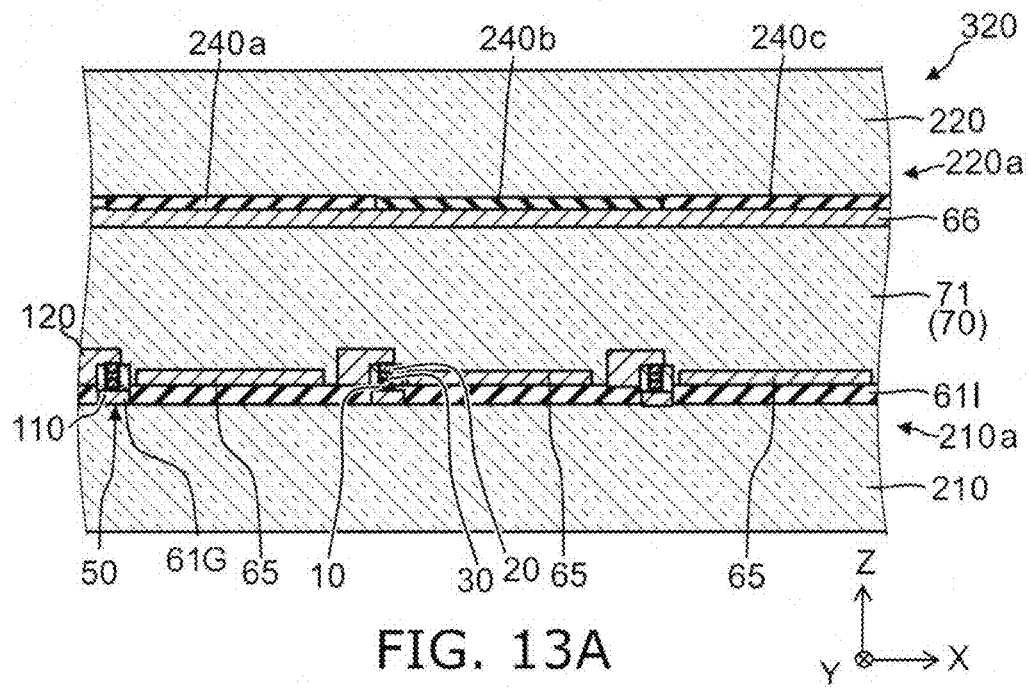
FIG. 13A and FIG. 13B are schematic cross-sectional views showing the configuration of the display device according to the second embodiment.
Figure 13B:
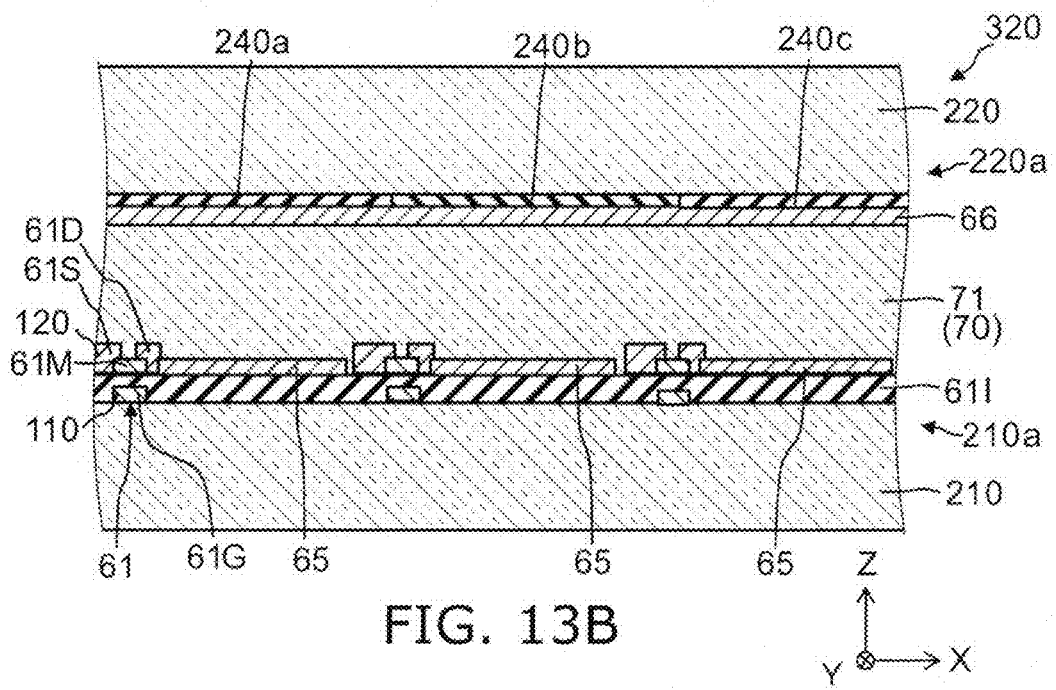

FIG. 13A and FIG. 13B are schematic cross-sectional views illustrating the configuration of the display device according to the second embodiment.

FIG. 13A is a cross-sectional view taken along line A1-A2 of FIG. 12. FIG. 13B is a cross-sectional view taken along line B1-B2 of FIG. 12. In FIG. 12, for easier viewing, the interlayer insulating film, the passivation film, etc. are omitted.

As shown in FIG. 12, the sensor unit 50 and the first transistor 61 are provided in an intersection portion between the first interconnection 110 and the second interconnection 120. The first gate 61G of the first transistor 61 is connected to the first interconnection 110, the first drain 61D is connected to the pixel electrode 65, and the first source 61S is connected to the second interconnection 120.

As shown in FIG. 13A, the first ferromagnetic layer 10 of the sensor unit 50 is connected to the first interconnection 110, and the second ferromagnetic layer 20 is connected to the second interconnection 120.

As shown in FIG. 13A and FIG. 13B, the first interconnection 110, the second interconnection 120, the sensor unit 50, the first transistor 61, and the pixel electrode 65 are provided on a first substrate 210. A gate insulating film 611 is provided on the first gate 61G of the first transistor 61, and a first semiconductor layer 61M is provided on the gate insulating film 611. The first drain 61D is provided on one end of the first semiconductor layer 61M, and the first source 61S is provided on the other end of the first semiconductor layer 61M.

A second substrate 220 (counter substrate) is provided opposed to the first substrate 210. A color filter layer (a first color layer 240a, a second color layer 240b, a third color layer 240c, etc.), for example, is provided on the major surface of the second substrate 220. The color filter layer includes, for example, the first color layer 240a that transmits light in a first wavelength band (e.g. blue), the second color layer 240b that is juxtaposed to the first color layer 240a in the X-Y plane and transmits light in a second wavelength band (e.g. green) different from the first wavelength band, and the third color layer 240c that is juxtaposed to the first color layer 240a and the second color layer 240b in the X-Y plane and transmits light in a third wavelength band (e.g. red) different from the first wavelength band and different from the second wavelength band. The counter electrode 66 is provided on the surface of the color filter layer.

The liquid crystal layer 71 is positioned between the first substrate 210 and the second substrate 220. A not-shown alignment film, for example, is provided on a surface of the pixel electrode 65 on the liquid crystal layer 71 side and a surface of the counter electrode 66 on the liquid crystal layer 71 side. Two polarizing layers (not shown) are provided, and the first substrate 210 and the second substrate are provided between the polarizing layers. Furthermore, for example, a backlight (not shown) is provided opposite to the first substrate 210. The backlight is provided as necessary and may be omitted.

The size (the footprint in the X-Y plane) of the first transistor 61 is, for example, approximately 5 μm×5 μm. The size of the sensor unit 50 can be made smaller than the size of the first transistor 61. A decrease in aperture ratio caused by providing the sensor unit 50 does not substantially occur.

For example, the length of the sensor unit 50 along the X-axis direction (a first axis perpendicular to the stacking direction from the first ferromagnetic layer 10 toward the second ferromagnetic layer 20) is not more than 5 μm. The length of the sensor unit 50 along the Y-axis direction (a second axis perpendicular to the stacking direction and perpendicular to the first axis) is not more than 5 μm. The area of each of the plurality of sensor units 50 in the X-Y plane (a plane including the first direction and the second direction) is not more than 5% of the area of each of the plurality of pixel electrodes 65 in the X-Y plane.

In the display device 320, for example, a finger of a user comes into contact with the upper surface of the second substrate 220 (the upper surface of the polarizing layer etc.). The stress by the contact is transferred to the sensor unit 50 via the liquid crystal layer 71. Thereby, a stress is applied to the sensor unit 50 to change the electric resistance Rs of the sensor unit 50, and the change is sensed by the control unit 101.

Although the counter electrode 66 is provided on the second substrate 220 in the example, the embodiment is not limited thereto. The counter electrode 66 may be provided on the first substrate 210. In this case, an electric field having a component parallel to the X-Y plane is applied to the liquid crystal layer 71, and the optical properties of the liquid crystal layer 71 change.

Figure 14:
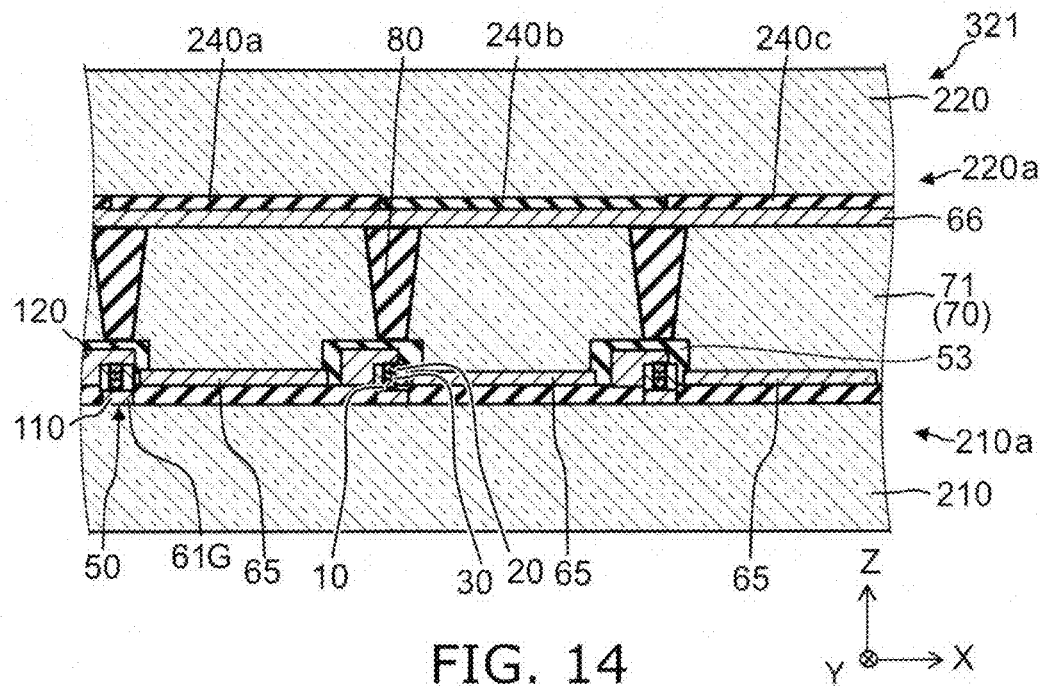
FIG. 14 is a schematic cross-sectional view showing the configuration of another display device according to the second embodiment.

FIG. 14 is a schematic cross-sectional view illustrating the configuration of another display device according to the second embodiment. FIG. 14 illustrates the configuration of another display device 321 according to the embodiment. The drawing is a cross-sectional view corresponding to the cross section taken along line A1-A2 of FIG. 12.

As shown in FIG. 14, in the display device 321, protrusions 80 are provided on the second substrate 220. In the example, the protrusions 80 are provided on the counter electrode 66. The protrusion 80 includes a portion overlapping with the sensor unit 50 when viewed from the Z-axis direction (the direction perpendicular to a plane including the first direction and the second direction). The protrusion 80 transfers the stress applied to the second substrate 220 to the sensor unit 50, for example.

Figure 15:
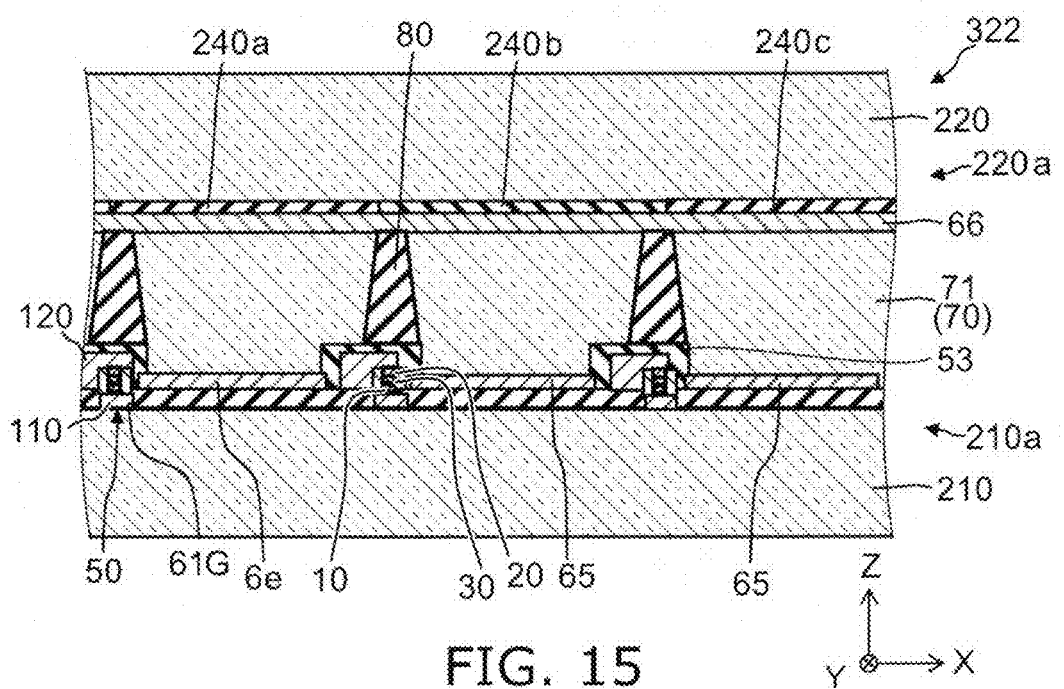
FIG. 15 is a schematic cross-sectional view showing the configuration of another display device according to the second embodiment.

FIG. 15 is a schematic cross-sectional view illustrating the configuration of another display device according to the second embodiment. FIG. 15 illustrates the configuration of another display device 322 according to the embodiment. The drawing is a cross-sectional view corresponding to the cross section taken along line A1-A2 of FIG. 12.

As shown in FIG. 15, in the display device 321, the protrusions 80 are provided on the first substrate 210. In the example, the protrusion 80 is formed on the sensor unit 50. Also in this case, the protrusion 80 includes a portion overlapping with the sensor unit 50 when viewed from the Z-axis direction. The protrusion 80 transfers the stress applied to the second substrate 220 to the sensor unit 50, for example.

Thus, the display devices 321 and 322 further include the first substrate 210, the second substrate 220, and the protrusion 80. The second substrate 220 is opposed to the first substrate 210. The plurality of protrusions 80 are provided on at least one of a surface of the first substrate 210 opposed to the second substrate 220 and a surface of the second substrate 220 opposed to the first substrate 210.

The touch panel (the first interconnection 110, the second interconnection 120, and the sensor unit 50), the plurality of first transistors 61, and the plurality of pixel electrodes 65 are provided on the surface mentioned above of the first substrate 210 opposed to the second substrate 220.

The optical layer 70 (e.g. the liquid crystal layer 71) is positioned between the first substrate 210 and the second substrate 220.

Here, it is assumed that the first substrate 210 and the components mentioned above provided on the first substrate 210 (e.g. the first interconnection 110, the second interconnection 120, the sensor unit 50, the plurality of first transistors 61, the plurality of pixel electrodes 65, etc.) are included in a first substrate unit 210a. It is assumed that the second substrate 220 and the components mentioned above provided on the second substrate 220 (e.g. the counter electrode 66 etc.) are included in a second substrate unit 220a.

Each of the plurality of protrusions 80 includes a portion overlapping with the sensor unit 50 when viewed from the Z-axis direction. The protrusion 80 transfers the stress applied to the first substrate 210 and the second substrate 220 to the sensor unit 50.

Thereby, the stress by touch input is efficiently transferred to the sensor unit 50, and the sensing accuracy is more improved.

A resin material, for example, may be used for the protrusion 80. A photosensitive or a non-photosensitive resin is used for the protrusion 80. Specifically, an acrylic resin, a polyimide resin, and the like are used. Photolithography, for example, is used to form the protrusion 80.

In the display devices 321 and 322, for example, the protrusion 80 is in contact with the first substrate unit 210a and the second substrate unit 220a. The protrusion 80 has the function of, for example, a spacer defining the spacing between the first substrate 210 (the first substrate unit 210a) and the second substrate 220 (the second substrate unit 220a), in addition to the function of transferring stress to the sensor unit 50.

Figure 16A:
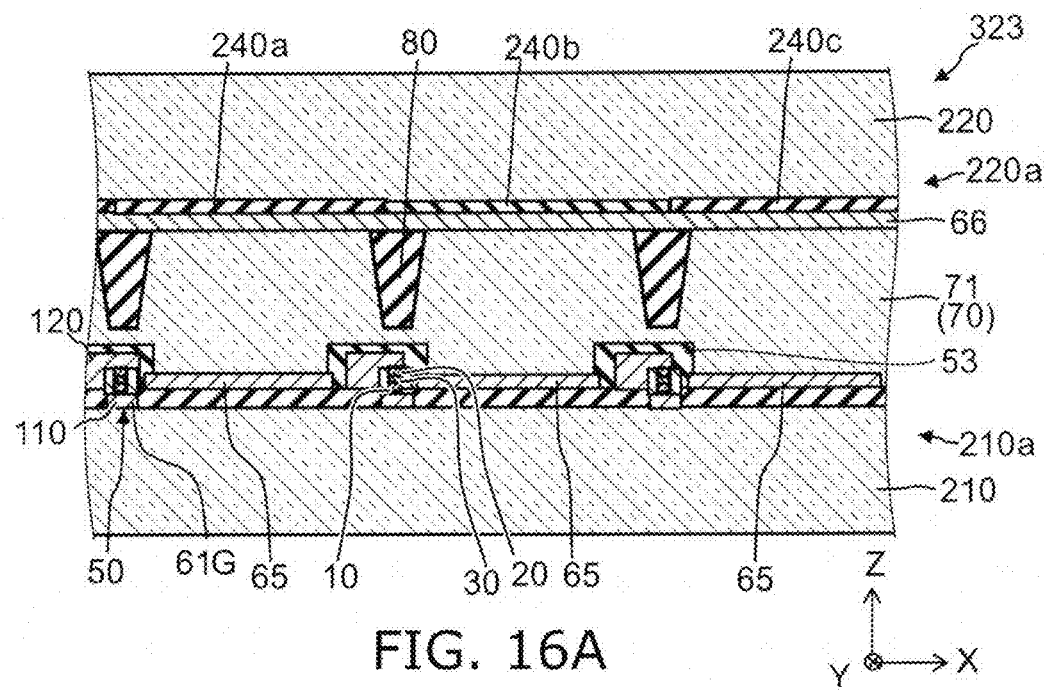
FIG. 16A and FIG. 16B are schematic cross-sectional views showing the configuration of another display device according to the second embodiment.
Figure 16B:
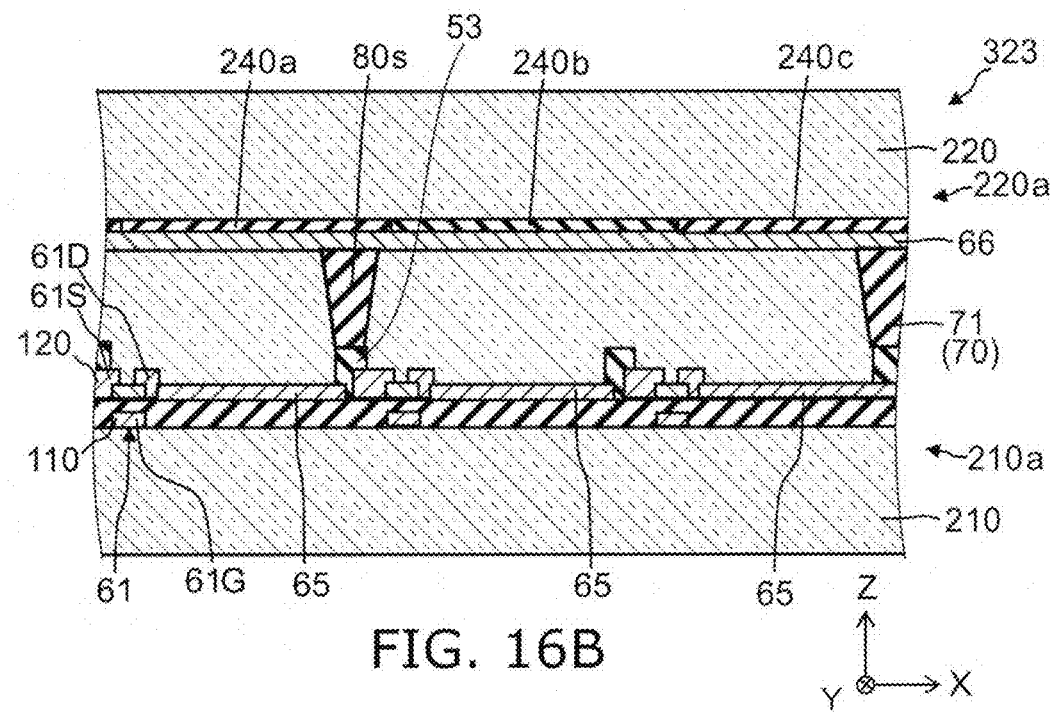

FIG. 16A and FIG. 16B are schematic cross-sectional views illustrating the configuration of another display device according to the second embodiment.

FIG. 16A is a cross-sectional view corresponding to the cross section taken along line A1-A2 of FIG. 12. FIG. 16B is a cross-sectional view corresponding to the cross section taken along line B1-B2 of FIG. 12.

As shown in FIG. 16A, in another display device 323 according to the embodiment, the protrusions 80 are provided on the second substrate unit 220a. The protrusion 80 is not in contact with the sensor unit 50 provided in the first substrate unit 210a.

As shown in FIG. 16B, spacers 80s are provided on the second substrate unit 220a. The spacer 80s is in contact with the first substrate unit 210a. The spacer 80s defines the spacing between the first substrate 210 (the first substrate unit 210a) and the second substrate 220 (the second substrate unit 220a).

Thus, in the example, the spacer 80s functioning as a spacer is provided separately from the protrusion 80. The protrusion 80 is, for example, not in contact with the sensor unit 50 when no stress is applied, and the protrusion 80 comes into contact with the sensor unit 50 when a certain level or more of stress is applied. Thereby, the applied stress can be transferred to the sensor unit 50 with good efficiency, and sensing with higher accuracy can be performed more stably.

Each of the protrusions 80 is provided to correspond to each of the sensor units 50. That is, each of the protrusions 80 is provided in each of the intersection portions between the first interconnections 110 and the second interconnections 120 (i.e., each of the sensing elements 50e). In contrast, the spacer 80s may not necessarily be provided in each of the intersection portions. The spacer 80s may be, for example, provided one in number for a plurality of pixel electrodes 65, and the density of the number of spacers 80s is arbitrary.

Figure 17A:
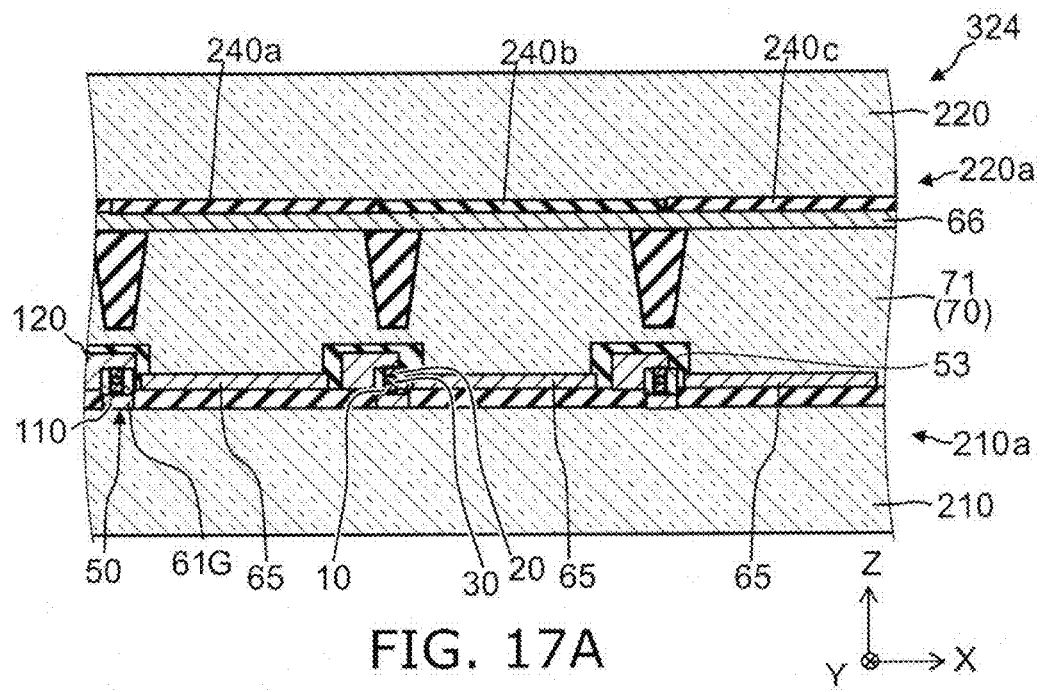
FIG. 17A and FIG. 17B are schematic cross-sectional views showing the configuration of another display device according to the second embodiment.
Figure 17B:
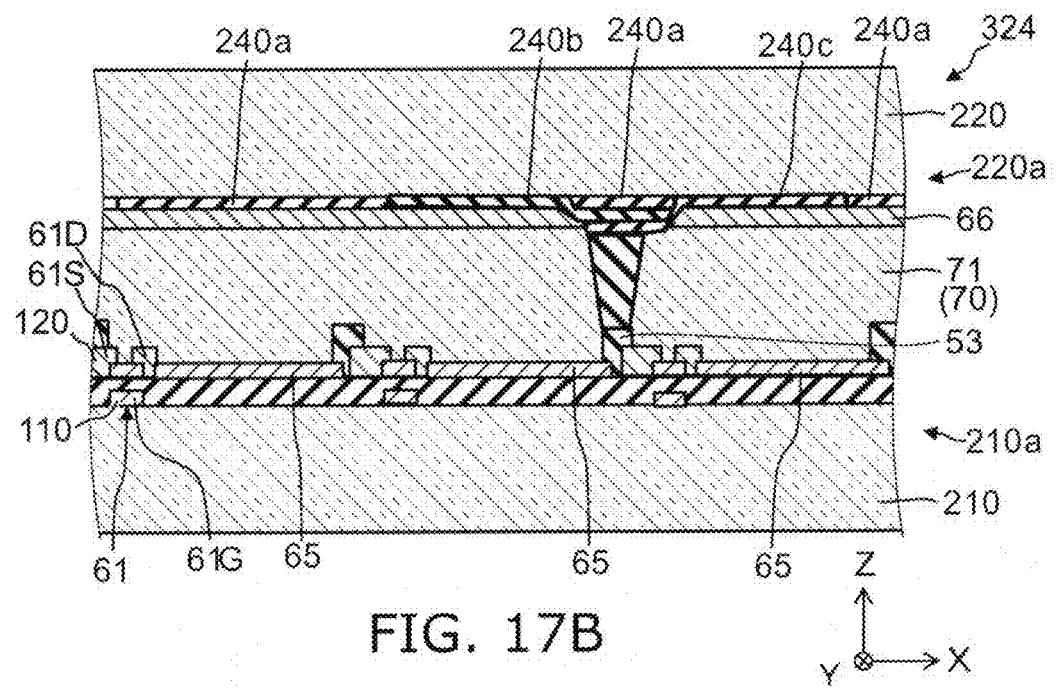

FIG. 17A and FIG. 17B are schematic cross-sectional views illustrating the configuration of another display device according to the second embodiment.

FIG. 17A is a cross-sectional view corresponding to the cross-section taken along line A1-A2 of FIG. 12. FIG. 17B is a cross-sectional view corresponding to the cross section taken along line B1-B2 of FIG. 12.

As shown in FIG. 17A, also in another display device 324 according to the embodiment, the protrusions 80 are provided on the second substrate unit 220a. The protrusion 80 is not in contact with the sensor unit 50 provided in the first substrate unit 210a.

As shown in FIG. 17B, the spacer 80s is provided on the second substrate unit 220a. In a place where the spacer 80s is provided, a layer that forms the first color layer 240a, a layer that forms the second color layer 240b, and a layer that forms the third color layer 240c are stacked. Therefore, the thickness of the color filter layer in the portion is thick. The spacer 80s is provided thereon. By the configuration, even in the case where the spacer 80s is formed using the same material and the same processes as the protrusion 80 and the height of the spacer 80s is the same as the height of the protrusion 80, the height of the spacer 80s when the second substrate 220 is taken as a standard is higher than the height of the protrusion 80.

By such a configuration, even when the spacer 80s is formed collectively with the protrusion 80, the spacer 80s functions as a spacer defining the spacing between the first substrate unit 210a and the second substrate unit 220a, and the height of the protrusion 80 can be set arbitrarily. For example, the protrusion 80 is not in contact with the sensor unit 50 when no stress is applied, and the protrusion 80 comes into contact with the sensor unit 50 when a certain level or more of stress is applied.

Thereby, sensing with higher accuracy can be performed more stably by a simple configuration.

Although the protrusion 80 (and the spacer 80s) is provided on the second substrate unit 220a in the display devices 323 and 324 mentioned above, the embodiment is not limited thereto. The protrusion 80 (and the spacer 80s) may be provided on the first substrate unit 210a.

Although the color filter (the first to third color layers 240a to 240c) is provided in the second substrate unit 220a in the examples mentioned above, the embodiment is not limited thereto. The color filter may be provided in the first substrate unit 210a.

In the case where the color filter is provided in the second substrate unit 220a and a portion where the first to third color layers 240a to 240c overlap is provided, the protrusion 80 (and the spacer 80s) may be provided on the first substrate unit 210a. In the case where the color filter is provided in the first substrate unit 210a and a portion where the first to third color layers 240a to 240c overlap is provided, the protrusion 80 (and the spacer 80s) may be provided on the second substrate unit 220a.

Furthermore, a structure body formed by stacking the first to third color layers 240a to 240c may be used as the protrusion 80. Thereby, some processes can be omitted.

Thus, the configuration of the protrusion 80 (and the spacer 80s) is arbitrary, and may be variously modified.

Figure 18:
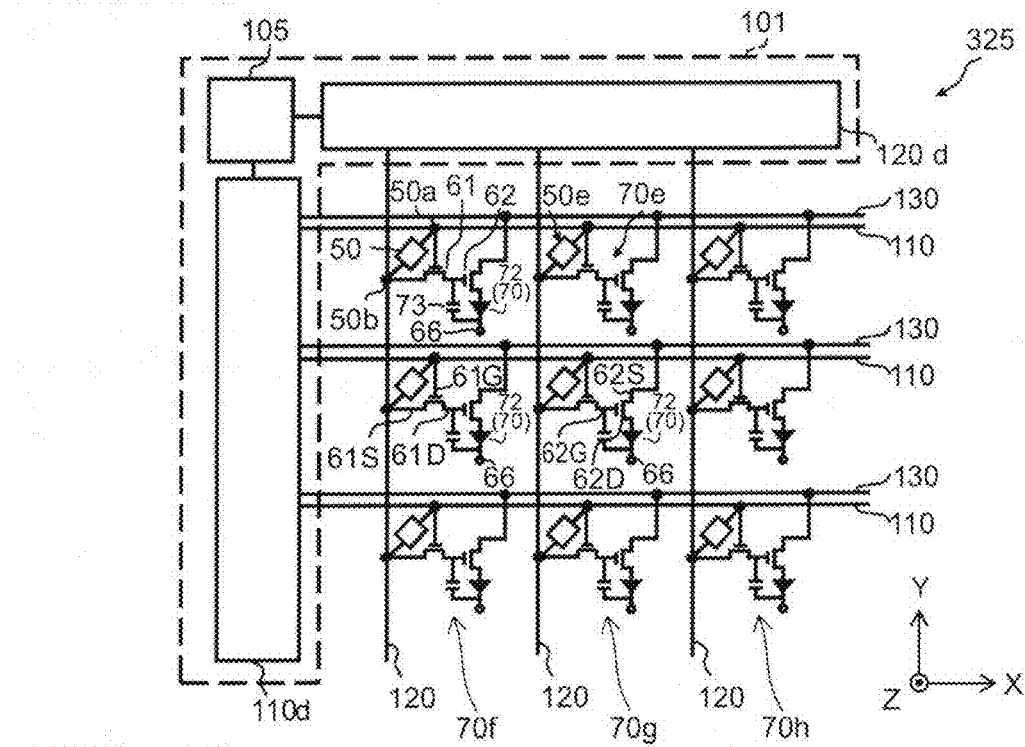
FIG. 18 is a schematic diagram showing the configuration of another display device according to the second embodiment.

FIG. 18 is a schematic diagram illustrating the configuration of another display device according to the second embodiment.

That is, FIG. 18 illustrates the configuration of another display device 325 according to the embodiment. In the example, an organic light-emitting layer 72, for example, is used as the optical layer 70. That is, the display device 325 is an organic EL display device having a touch panel function.

The display device 325 further includes a plurality of third interconnections 130 and a plurality of second transistors 62, in addition to the touch panel 310 described in regard to the first embodiment, the plurality of first transistors 61, the plurality of pixel electrodes 65, and the optical layer 70.

The plurality of third interconnections 130 is arranged along, for example, the third direction. Each of the plurality of third interconnections 130 extends along, for example, the fourth direction. For example, the third interconnection 130 is arranged parallel to the first interconnection 110. Each of the plurality of third interconnections 130 is arranged between two of the plurality of first interconnections 110. In the example, the plurality of third interconnections 130 is arranged along the Y-axis direction. Each of the plurality of third interconnections 130 extends along the X-axis. However, the embodiment is not limited thereto, and a configuration is possible in which the plurality of third interconnections 130 is arranged along the X-axis direction and each of the plurality of third interconnections 130 extends along the Y-axis direction. In the following, a description is given on the assumption that the plurality of third interconnections 130 is arranged along the Y-axis direction and each of the plurality of third interconnections 130 extends along the X-axis.

The gate (a second gate 62G) of each of the plurality of second transistors 62 is connected to one end (e.g. the first drain 61D) of each of the first transistors 61. One end (e.g. a second drain 62D) of each of the plurality of second transistors 62 is connected to each of the plurality of pixel electrodes 65. The other end (e.g. a second source 62S) of each of the plurality of second transistors 62 is connected to each of the plurality of third interconnections 130. The optical layer 70 contains an organic light emitting material.

Also the display device 325 having such a configuration can provide a touch panel and a display device that allow touch input with high resolution.

In the specific example, a capacitor 73 is provided in each display pixel 70e. One end of the capacitor 73 is connected to the first drain 61D. The other end of the capacitor 73 is electrically connected to the counter electrode 66.

Figure 19:
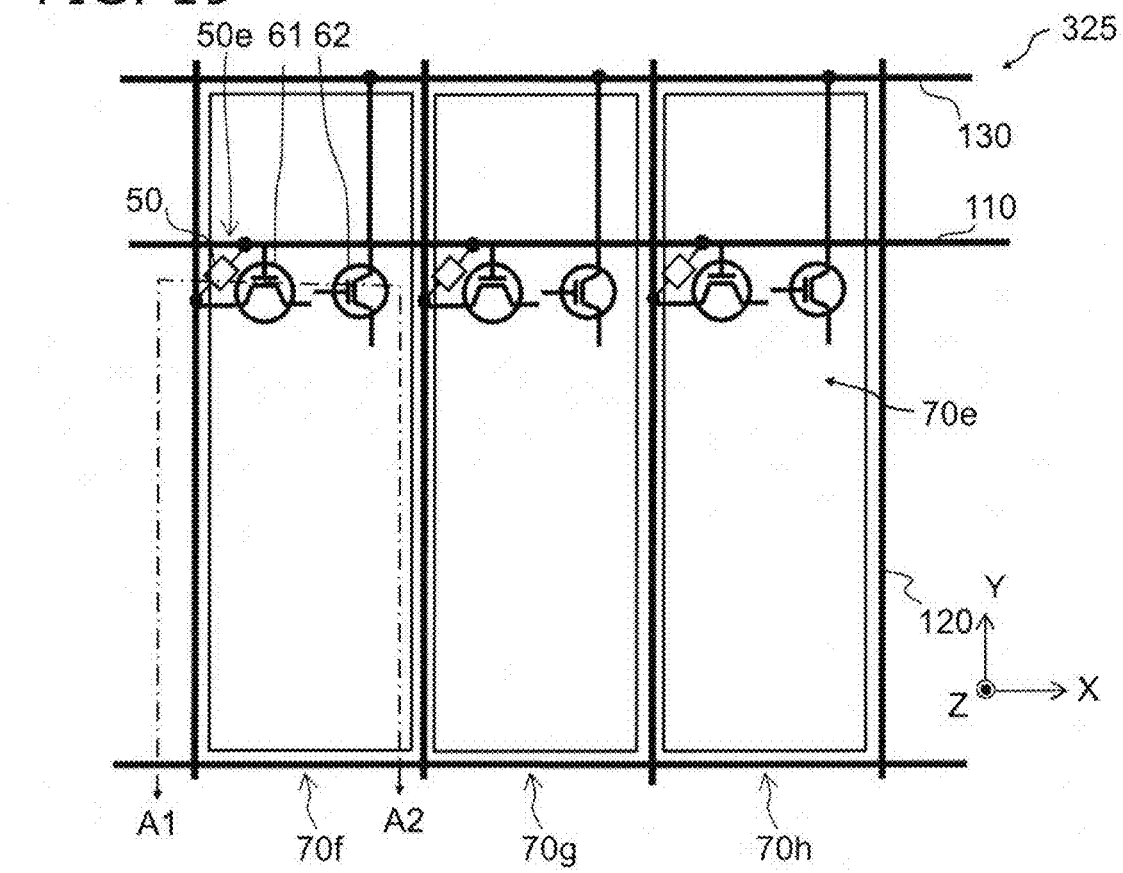
FIG. 19 is a schematic plan view showing the configuration of another display device according to the second embodiment.
Figure 20:
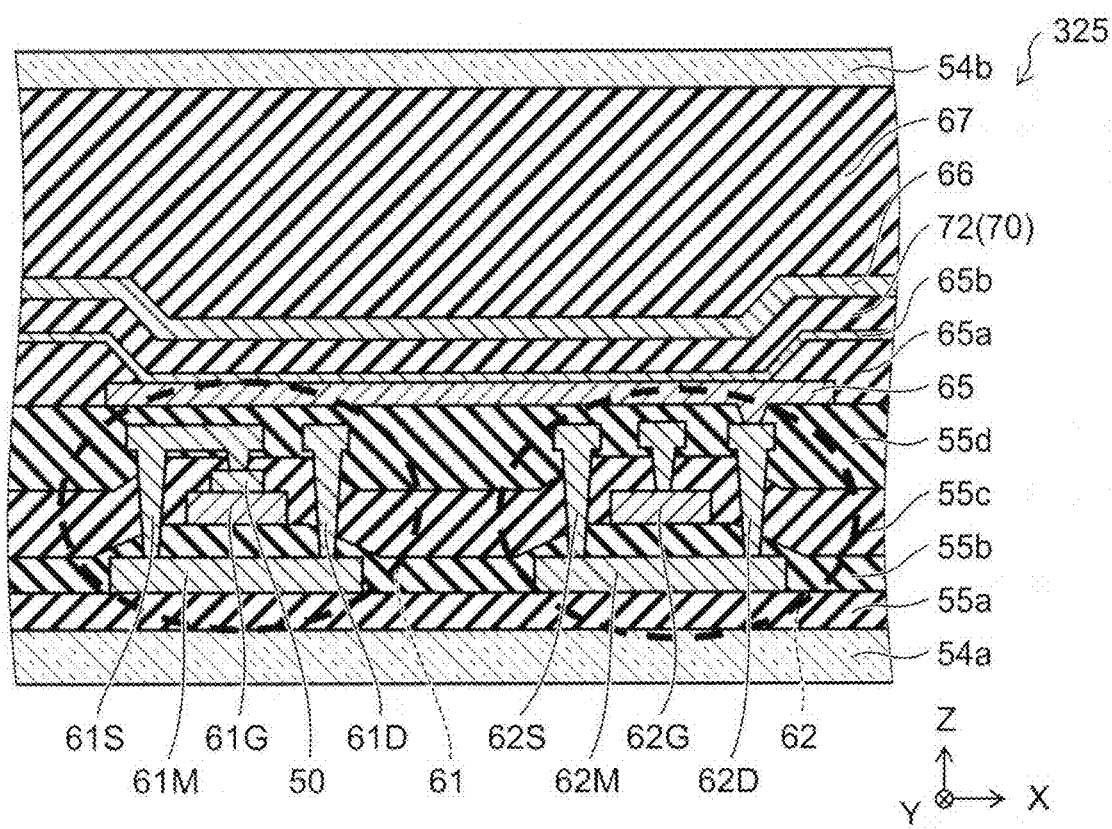
FIG. 20 is a schematic cross-sectional view showing the configuration of another display device according to the second embodiment.

FIG. 19 is a schematic plan view illustrating the configuration of another display device according to the second embodiment. FIG. 20 is a schematic cross-sectional view illustrating the configuration of another display device according to the second embodiment. FIG. 19 illustrates three display pixels 70e of the display device 325. FIG. 20 illustrates a cross section taken along line A1-A2 of FIG. 19.

As shown in FIG. 19, for example, a first pixel 70f (e.g. a red color pixel), a second pixel 70g (e.g. a green color pixel), and a third pixel 70h (e.g. a blue color pixel) are provided. The first pixel 70f, the second pixel 70g, and the third pixel 70h emit light of different wavelengths.

As shown in FIG. 20, the base 54a is provided. A glass substrate, for example, is used for the base 54a. A first insulating layer 55a is provided on the major surface of the base 54a. The first semiconductor layer 61M and a second semiconductor layer 62M are provided on the first insulating layer 55a. The first semiconductor layer 61M forms part of the first transistor 61. The second semiconductor layer 62M forms part of the second transistor 62.

A second insulating layer 55b is provided on the first semiconductor layer 61M, on the second semiconductor layer 62M, and on the first insulating layer 55a. The first gate 61G is provided on the second insulating layer 55b on the first semiconductor layer 61M. The second gate 62G is provided on the second insulating layer 55b on the second semiconductor layer 62M. The sensor unit 50 is provided on the first gate 61G. The first gate 61G is electrically connected to the lower surface (one end) of the sensor unit 50.

The first source 61S is provided on a part of the first semiconductor layer 61M. The first source 61S is electrically connected to the upper surface (the other end) of the sensor unit 50. The first drain 61D is provided on another part of the first semiconductor layer 61M. Thereby, the first transistor 61 is formed. The second source 62S is provided on a part of the second semiconductor layer 62M. The second drain 62D is provided on another part of the second semiconductor layer 62M. Thereby, the second transistor 62 is formed. The first transistor 61 and the second transistor 62 are covered with a third insulating layer 55c and a fourth insulating layer 55d formed on the third insulating layer 55c.

The pixel electrode 65 is provided on the fourth insulating layer 55d. The second drain 62D is electrically connected to the pixel electrode 65.

A barrier wall 65a is provided on a peripheral region of the pixel electrode 65. The barrier wall 65a exposes part of the pixel electrode 65. A conductive layer 65b is provided on the pixel electrode 65. The organic light-emitting layer 72 (the optical layer 70) is provided on the conductive layer 65b. The counter electrode 66 is provided on the organic light-emitting layer 72. A resin layer 67 is provided on the counter electrode 66. The cover layer 54b is provided on the resin layer 67. Glass or the like is used for the cover layer 54b. The cover layer 54b seals, for example, the organic resin layer 72.

Third Embodiment

Figure 21:
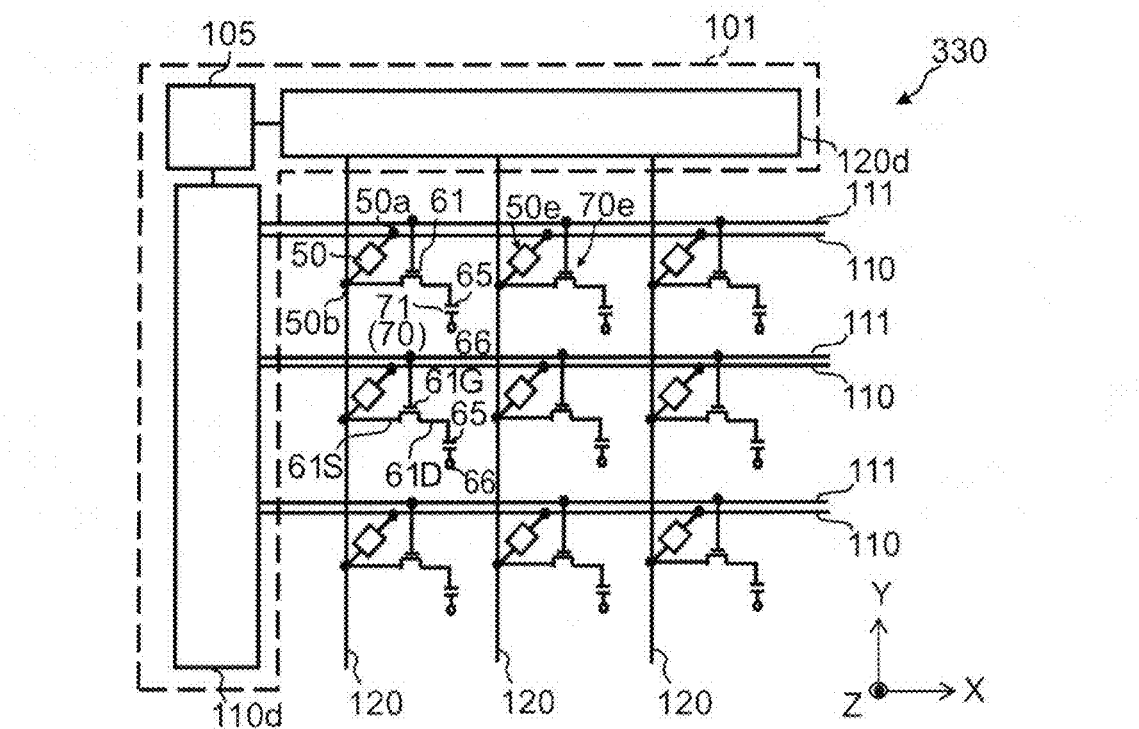
FIG. 21 is a schematic diagram showing the configuration of a display device according to a third embodiment.

FIG. 21 is a schematic diagram illustrating the configuration of a display device according to a third embodiment.

As shown in FIG. 21, a display device 330 according to the embodiment further includes a plurality of scan interconnections for displaying 111, in addition to the touch panel 310 described in regard to the first embodiment, the plurality of first transistors 61, the plurality of pixel electrodes 65, and the optical layer 70.

The plurality of scan interconnections for displaying 111 is arranged along the first direction. Each of the plurality of scan interconnections for displaying 111 extends along the second direction. That is, the scan interconnection for displaying 111 is provided parallel to the first interconnection 110.

The gate (the first gate 61G) of each of the plurality of first transistors 61 is connected to each of the plurality of scan interconnections for displaying 111. The other end (e.g. the first source 61S) of each of the plurality of first transistors 61 is connected to each of the plurality of second interconnections 120.

In the example, the second interconnection 120 for sensing the electric resistance Rs of the sensor unit 50 is used also in the display operation DO. On the other hand, the scan interconnection for displaying 111 is provided separately from the first interconnection 110.

Figure 22:
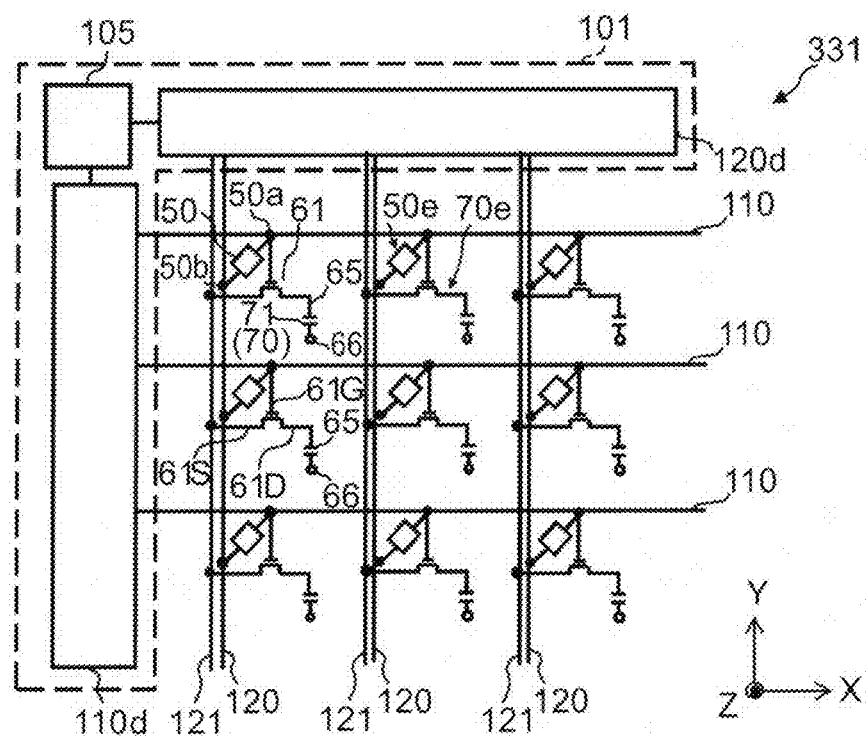
FIG. 22 is a schematic diagram showing the configuration of another display device according to the third embodiment.

FIG. 22 is a schematic diagram illustrating the configuration of another display device according to the third embodiment.

As shown in FIG. 22, another display device 331 according to the embodiment further includes a plurality of signal interconnections for displaying 121, in addition to the touch panel 310 described in regard to the first embodiment, the plurality of first transistors 61, the plurality of pixel electrodes 65, and the optical layer 70.

The plurality of signal interconnections for displaying 121 is arranged along the third direction. Each of the plurality of signal interconnections for displaying 121 extends along the fourth direction. That is, the signal interconnection for displaying 121 is provided parallel to the second interconnection 120.

The gate (the first gate 61G) of each of the plurality of first transistors 61 is connected to each of the plurality of first interconnections 110. The other end (e.g. the first source 61S) of each of the plurality of first transistors 61 is connected to each of the plurality of signal interconnections for displaying 121.

In the example, the first interconnection 110 for sensing the electric resistance Rs of the sensor unit 50 is used also in the display operation DO. On the other hand, the signal interconnection for displaying 121 is provided separately from the second interconnection 120.

Figure 23:
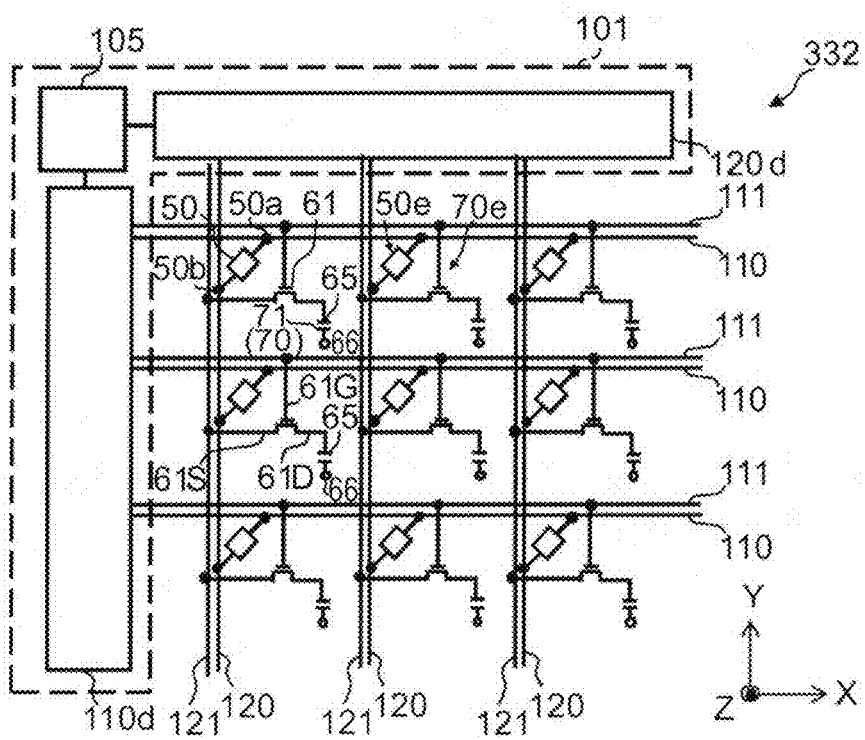
FIG. 23 is a schematic diagram showing the configuration of another display device according to the third embodiment.

FIG. 23 is a schematic diagram illustrating the configuration of another display device according to the third embodiment.

As shown in FIG. 23, another display device 332 according to the embodiment further includes the plurality of scan interconnections for displaying 111 and the plurality of signal interconnections for displaying 121, in addition to the touch panel 310 described in regard to the first embodiment, the plurality of first transistors 61, the plurality of pixel electrodes 65, and the optical layer 70.

The plurality of scan interconnections for displaying 111 is arranged along the first direction. Each of the plurality of scan interconnections for displaying 111 extends along the second direction. The plurality of signal interconnections for displaying 121 is arranged along the third direction. Each of the plurality of signal interconnections for displaying 121 extends along the fourth direction.

The gate (the first gate 61G) of each of the plurality of first transistors 61 is connected to each of the plurality of scan interconnections for displaying 111. The other end (e.g. the first source 61S) of each of the plurality of first transistors 61 is connected to each of the plurality of signal interconnections for displaying 121.

In the example, the scan interconnection for displaying 111 and the signal interconnection for displaying 121 are provided separately from the first interconnection 110 and the second interconnection 120 for sensing the electric resistance Rs of the sensor unit 50.

In the display devices 330 to 332, the current path of the sensing operation SO is different from the current path of the display operation DO. Therefore, the condition for the preferable range of the resistance in the sensor unit 50 is removed. That is, the low resistance value Rl and the high resistance value Rh of the sensor unit 50 can be set independently of the electric resistance $R_{TFTon}$ and the electric resistance $R_{TFToff}$ of the first transistor 61. That is, the design flexibility of the sensor unit 50 is great.

In the touch sensors and the display devices according to the first to third embodiments, touch input with high position resolution can be performed. Therefore, unlike a rough way of using a touch panel like conventional ones, usage that has been conventionally impossible is enabled.

For example, fingerprint recognition becomes possible on a display. By having sensing position resolution corresponding to the unevenness of a fingerprint, personal identification can be made by putting a finger or hand directly onto the display. For example, by providing a strain sensor (the sensor unit 50) in all the pixels, the position analysis of a fingerprint of a finger is performed. For example, it becomes also possible to make personal identification of a fingerprint by imaging the strain information sensed by the pixels. Thereby, a special sensor for comparing fingers does not need to be used.

Furthermore, as a result of high position resolution and pressure sensitivity, it becomes also possible to determine the subtleties of a hand-written letter such as one written with a brush. In contrast to current pen-input mobile terminals in which a digital letter is used, in the embodiment, a displaying and not displaying state can be selected for each pixel and therefore interaction with the touch panel provides a natural feeling, for example, sensing input to create a hand-written letter.

Furthermore, it is also possible to provide a way of simulating page turning with an intensity variation. At the present, whether the operation of turning a simulated page is performed or not is determined from sensing which is made in a digital manner. However, by the embodiment, page turning in an analog manner is enabled in which pages are turned in units of 10 pages or 1 page depending on the area of the region pushed with a finger at the time of turning a page. For example, when turning page by page, the region pushed with a finger at the beginning is small and the pushed region moves. On the other hand, when the region pushed at the beginning is large and the pushed region moves, the operation can be recognized as an operation of turning a plurality of pages. Thereby, the feeling of turning pages can be made closer to that of leafing through an actual paper book. This is because the touch panel according to the embodiment can grasp the pushed area accurately and can thereby make such detailed control. The number of pages turned can be changed by the magnitude of the area of the region pushed.

The current display has sufficiently high definition, and can therefore display fine shapes of hand-written letters easily. However, in regard to inputting, since the position resolution of input sensing is very rough, it is difficult to input a feel like that of handwriting with a brush onto an electronic terminal. However, by the embodiment, since strain sensors (sensor units 50) can be, for example, closely arranged in all the pixels, position resolution with high definition is obtained. Thereby, also a writing form like that of writing with a brush can be electronically inputted.

The embodiment provides a touch panel and a display device that allow touch input with high resolution.

Hereinabove, embodiments of the invention are described with reference to specific examples. However, the embodiment of the invention is not limited to these specific examples. For example, one skilled in the art may appropriately select specific configurations of components of touch panels such as first interconnections, second interconnections, sensor units, first ferromagnetic layers, second ferromagnetic layers, intermediate layers, and control units and components of display devices such as first transistors, second transistors, pixel electrodes, optical layers, liquid crystal layers, and third interconnections from known art and similarly practice the invention. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all touch panels and display devices that can be obtained by an appropriate design modification by one skilled in the art based on the touch panels and the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device comprising:
   a touch panel including:
      a plurality of first interconnections arranged along a first direction, each of the first interconnections extending along a second direction intersecting with the first direction;
      a plurality of second interconnections arranged along a third direction intersecting with the first direction, each of the second interconnections extending along a fourth direction intersecting with the third direction;

a plurality of sensor units each provided in an intersection portion between each of the first interconnections and each of the second interconnections, each of the sensor units including a first ferromagnetic layer, a second ferromagnetic layer, and an intermediate layer containing a nonmagnetic material, allowing a current to be passed between the first ferromagnetic layer and the second ferromagnetic layer via the intermediate layer, having one end connected to each of the first interconnections, and having another end connected to each of the second interconnections; and a control unit connected to the first interconnections and the second interconnections, an electric resistance between the first ferromagnetic layer of each of the sensor units and the second ferromagnetic layer of each of the sensor units being configured to change between a high resistance value and a low resistance value lower than the high resistance value in accordance with a stress applied to the sensor units, the control unit being configured to sense a change in the electric resistance in the sensor units;

a first transistor provided in each of the intersection portions;

a pixel electrode provided in each of the intersection portions and directly or indirectly connected to one end of each of the first transistors; and an optical layer configured to emit light or change an optical property of the optical layer including at least one of birefringence, optical rotation, scattering, diffraction, and absorption based on a charge supplied to the pixel electrode via the first transistor, wherein a gate of each of the first transistors is connected to each of the first interconnection, another end of each of the plurality of first transistors is connected to each of the plurality of second interconnections, the low resistance value is higher than an electric resistance between the one end of the first transistors and the other end of the first transistors when a portion between the one end of the first transistors and the other end of the first transistors is in a conduction state, and the high resistance value is lower than an electric resistance between the one end of the first transistors and the other end of the first transistors when a portion between the one end of the first transistors and the other end of the first transistors is in a non-conduction state.

2. The device according to claim 1, wherein
the low resistance value is higher than 1 megaohm and
the high resistance value is lower than 1 teraohm.

3. The device according to claim 1, further comprising a plurality of scan interconnections for displaying, the scan interconnections for displaying being arranged along the first direction, each of the scan interconnections for displaying extending along the second direction, a gate of each of the first transistors being connected to each of the scan interconnections for displaying, another end of each of the first transistors being connected to each of the second interconnections.

4. The device according to claim 1, further comprising a plurality of signal interconnections for displaying, the signal interconnections for displaying being arranged along the third direction, each of the signal interconnections for displaying extending along the fourth direction, a gate of each of the first transistors being connected to each of the first interconnections, another end of each of the first transistors being connected to each of the signal interconnections for displaying.

5. The device according to claim 1, further comprising:
a plurality of scan interconnections for displaying; and
a plurality of signal interconnections for displaying,
the scan interconnections for displaying being arranged along the first direction, each of the scan interconnections for displaying extending along the second direction,
the signal interconnections for displaying being arranged along the third direction, each of the signal interconnections for displaying extending along the fourth direction,
the gate of each of the first transistors being connected to each of the scan interconnections for displaying,
another end of each of the first transistors being connected to each of the signal interconnections for displaying.

6. The device according to claim 1, wherein a length of the sensor units along a first axis perpendicular to a stacking direction from the first ferromagnetic layer toward the second ferromagnetic layer is not more than 5 micrometers and a length of the sensor units along a second axis perpendicular to the stacking direction and perpendicular to the first axis is not more than 5 micrometers.

7. The device according to claim 1, wherein an area of each of the sensor units in a plane including the first direction and the second direction is not more than 5% of an area of each of the pixel electrodes in the plane.

8. The device according to claim 1, wherein the optical layer contains a liquid crystal.

9. The device according to claim 1, further comprising:
a plurality of third interconnections; and
a plurality of second transistors,
the gate of each of the second transistors being connected to the one end of each of the first transistors,
one end of each of the second transistors being connected to each of the pixel electrodes,
another end of each of the second transistors being connected to each of the third interconnections,
the optical layer containing an organic light emitting material.

10. The device according to claim 1, wherein
at least one of the first ferromagnetic layer and the second ferromagnetic layer includes at least one of Fe, Co, and Ni and
the intermediate layer includes at least one of an oxide of at least one of Mg, Al, and Ti and a nitride of at least one of Mg, Al, and Ti.

11. The device according to claim 1, wherein a thickness of the intermediate layer is not less than 1 nanometer and not more than 3 nanometers.

12. The device according to claim 1, wherein a magnetization direction of at least one ferromagnetic layer of the first ferromagnetic layer and the second ferromagnetic layer changes in accordance with the stress and an absolute value of a magnetostrictive coefficient of the at least one ferromagnetic layer is not less than $10^{-5}$.

13. A display device comprising:
a touch panel including:
a plurality of first interconnections arranged along a first direction, each of the first interconnections extending along a second direction intersecting with the first direction;
a plurality of second interconnections arranged along a third direction intersecting with the first direction, each of the second interconnections extending along a fourth direction intersecting with the third direction;

a plurality of sensor units each provided in an intersection portion between each of the first interconnections and each of the second interconnections, each of the sensor units including a first ferromagnetic layer, a second ferromagnetic layer, and an intermediate layer containing a nonmagnetic material, allowing a current to be passed between the first ferromagnetic layer and the second ferromagnetic layer via the intermediate layer, having one end connected to each of the first interconnections, and having another end connected to each of the second interconnections; and a control unit connected to the first interconnections and the second interconnections, an electric resistance between the first ferromagnetic layer of each of the sensor units and the second ferromagnetic layer of each of the sensor units being configured to change between a high resistance value and a low resistance value lower than the high resistance value in accordance with a stress applied to the sensor units, the control unit being configured to sense a change in the electric resistance in the sensor units;

a first transistor provided in each of the intersection portions;

a pixel electrode provided in each of the intersection portions and directly or indirectly connected to one end of each of the first transistors;

an optical layer configured to emit light or change an optical property of the optical layer including at least one of birefringence, optical rotation, scattering, diffraction, and absorption based on a charge supplied to the pixel electrode via the first transistor, a first substrate;

a second substrate opposed to the first substrate; and a plurality of protrusions provided on at least one of a surface of the first substrate opposed to the second substrate and a surface of the second substrate opposed to the first substrate, the touch panel, the first transistors, and the pixel electrodes being provided on the surface of the first substrate opposed to the second substrate, the optical layer being disposed between the first substrate and the second substrate, each of the protrusions including a portion overlapping with the sensor unit when viewed from a direction perpendicular to a plane including the first direction and the second direction, the protrusions being configured to transfer a stress applied to the first substrate and the second substrate to the sensor units.

14. The device according to claim 13, wherein the protrusions include a same material as a material used for a spacer defining a spacing between the first substrate and the second substrate.

* * * * *